United States Patent
Stephanick et al.

(10) Patent No.: US 8,466,896 B2
(45) Date of Patent: *Jun. 18, 2013

(54) SYSTEM AND APPARATUS FOR SELECTABLE INPUT WITH A TOUCH SCREEN

(75) Inventors: James Stephanick, Seattle, WA (US); Christina James, Seattle, WA (US); Ethan R. Bradford, Seattle, WA (US); Michael R. Longé, Seattle, WA (US)

(73) Assignee: Tegic Communications, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/552,564

(22) Filed: Jul. 18, 2012

(65) Prior Publication Data

US 2012/0280931 A1    Nov. 8, 2012

Related U.S. Application Data

(60) Continuation of application No. 12/910,684, filed on Oct. 22, 2010, now Pat. No. 8,237,682, which is a continuation of application No. 12/463,635, filed on May 11, 2009, now Pat. No. 7,821,503, which is a division of application No. 10/881,819, filed on Jun. 28, 2004, now Pat. No. 7,750,891, and a continuation-in-part of application No. 10/677,890, filed on Oct. 1, 2003, now Pat. No. 7,286,115, and a continuation-in-part of application No. 10/205,950, filed on Jul. 25, 2002, now Pat. No. 6,970,599, and a continuation-in-part of application No. 09/580,319, filed on May 26, 2000, now Pat. No. 6,801,190.

(60) Provisional application No. 60/504,552, filed on Sep. 19, 2003, provisional application No. 60/461,735, filed on Apr. 9, 2003, provisional application No. 60/136,613, filed on May 27, 1999.

(51) Int. Cl.
G06F 3/041   (2006.01)
G06K 11/06   (2006.01)
G08C 21/00   (2006.01)

(52) U.S. Cl.
USPC ............... 345/173; 178/18.01; 178/18.03

(58) Field of Classification Search
USPC .......... 345/173–179; 178/18.01–20.04; 341/5
See application file for complete search history.

(56) References Cited

U.S. PATENT DOCUMENTS 3,980,869 A    9/1976   Lombardino et al.
4,286,329 A    8/1981   Goertzel et al.

(Continued)

FOREIGN PATENT DOCUMENTS

CN    1116335       2/1996
CN    1190205 A     8/1998

(Continued)

OTHER PUBLICATIONS

"Handbook for the Palm V™ Organizer", Palm Computing, Inc., Santa Clara, CA, 1998-1999, 244 pages.

(Continued)

*Primary Examiner* — Srilakshmi K Kumar
(74) *Attorney, Agent, or Firm* — Michael A. Glenn; Glenn Patent Group

(57) ABSTRACT

A selective input system and method are provided which track the motion of a pointing device over a region or area. The pointing device can be a touchpad, a mouse, a pen, or any device capable of providing two or three-dimensional location. The region or area is preferably augmented with a printed or actual keyboard/pad. Alternatively, a representation of the location of the pointing device over a virtual keyboard/pad can be dynamically shown on an associated display. The system identifies selections of items or characters by detecting parameters of motion of the pointing device, such as length of motion, a change in direction, a change in velocity, and or a lack of motion at locations that correspond to features on the keyboard/pad. The input system is preferably coupled to a text disambiguation system such as a T9® or Sloppytype™ system, to improve the accuracy and usability of the input system.

30 Claims, 13 Drawing Sheets

U.S. PATENT DOCUMENTS

| | | |
|---|---|---|
| 4,353,552 A | 10/1982 | Pepper, Jr. et al. |
| 4,365,235 A | 12/1982 | Greanias et al. |
| 4,439,649 A | 3/1984 | Cecchi |
| 4,454,592 A | 6/1984 | Cason et al. |
| 4,544,276 A | 10/1985 | Horodeck |
| 4,559,598 A | 12/1985 | Goldwasser et al. |
| 4,561,105 A | 12/1985 | Crane et al. |
| 4,573,196 A | 2/1986 | Crane et al. |
| 4,689,768 A | 8/1987 | Heard et al. |
| 4,710,758 A | 12/1987 | Mussler et al. |
| 4,725,694 A | 2/1988 | Auer et al. |
| 4,782,464 A | 11/1988 | Gray et al. |
| 4,783,758 A | 11/1988 | Kucera |
| 4,783,761 A | 11/1988 | Gray et al. |
| 4,891,777 A | 1/1990 | Lapeyre |
| 4,891,786 A | 1/1990 | Goldwasser |
| 5,109,352 A | 4/1992 | O'Dell |
| 5,127,055 A | 6/1992 | Larkey |
| 5,187,480 A | 2/1993 | Thomas et al. |
| 5,224,179 A | 6/1993 | Denker et al. |
| 5,261,112 A | 11/1993 | Futatsugi et al. |
| 5,305,205 A | 4/1994 | Weber et al. |
| 5,317,507 A | 5/1994 | Gallant |
| 5,347,295 A | 9/1994 | Agulnick et al. |
| 5,451,724 A | 9/1995 | Nakazawa et al. |
| 5,457,454 A | 10/1995 | Sugano |
| 5,462,711 A | 10/1995 | Ricottone |
| 5,533,147 A | 7/1996 | Arai et al. |
| 5,541,988 A | 7/1996 | Draganoff |
| 5,561,446 A | 10/1996 | Montlick |
| 5,572,423 A | 11/1996 | Church |
| 5,574,482 A | 11/1996 | Niemeier |
| 5,577,170 A | 11/1996 | Karow |
| 5,583,946 A | 12/1996 | Gourdol |
| 5,586,198 A | 12/1996 | Lakritz |
| 5,612,690 A | 3/1997 | Levy |
| 5,616,031 A | 4/1997 | Logg |
| 5,649,223 A | 7/1997 | Freeman |
| 5,664,896 A | 9/1997 | Blumberg |
| 5,675,361 A | 10/1997 | Santilli |
| 5,734,749 A | 3/1998 | Yamada et al. |
| 5,734,750 A | 3/1998 | Arai et al. |
| 5,745,719 A | 4/1998 | Falcon |
| 5,748,512 A | 5/1998 | Vargas |
| 5,754,173 A | 5/1998 | Hiura et al. |
| 5,754,686 A | 5/1998 | Harada et al. |
| 5,784,008 A | 7/1998 | Raguseo |
| 5,786,776 A | 7/1998 | Kisaichi et al. |
| 5,796,867 A | 8/1998 | Chen et al. |
| 5,798,760 A | 8/1998 | Vayda et al. |
| 5,799,269 A | 8/1998 | Schabes et al. |
| 5,802,460 A | 9/1998 | Parvulescu et al. |
| 5,805,911 A | 9/1998 | Miller |
| 5,812,657 A | 9/1998 | Reding et al. |
| 5,812,696 A | 9/1998 | Arai et al. |
| 5,812,697 A | 9/1998 | Sakai et al. |
| 5,818,437 A | 10/1998 | Grover et al. |
| 5,828,999 A | 10/1998 | Bellegarda et al. |
| 5,870,492 A | 2/1999 | Shimizu et al. |
| 5,896,321 A | 4/1999 | Miller et al. |
| 5,917,476 A | 6/1999 | Czerniecki |
| 5,917,889 A | 6/1999 | Brotman et al. |
| 5,920,303 A | 7/1999 | Baker et al. |
| 5,923,793 A | 7/1999 | Ikebata |
| 5,926,566 A | 7/1999 | Wang et al. |
| 5,928,588 A | 7/1999 | Chen et al. |
| 5,933,526 A | 8/1999 | Sklarew |
| 5,937,420 A | 8/1999 | Karow et al. |
| 5,952,942 A | 9/1999 | Balakrishnan et al. |
| 5,953,541 A | 9/1999 | King et al. |
| 5,956,021 A | 9/1999 | Kubota et al. |
| 5,963,671 A | 10/1999 | Comerford et al. |
| 5,973,676 A | 10/1999 | Kawakura |
| 6,002,390 A | 12/1999 | Masui |
| 6,002,799 A | 12/1999 | Sklarew |
| 6,005,495 A | 12/1999 | Connolly et al. |
| 6,008,799 A | 12/1999 | Van Kleeck |
| 6,009,444 A | 12/1999 | Chen |
| 6,011,537 A | 1/2000 | Slotznick et al. |
| 6,011,554 A | 1/2000 | King et al. |
| 6,018,708 A | 1/2000 | Dahan et al. |
| 6,023,760 A | 2/2000 | Karttunen |
| 6,028,959 A | 2/2000 | Wang et al. |
| 6,037,942 A | 3/2000 | Millington |
| 6,041,137 A | 3/2000 | Van Kleeck |
| 6,044,165 A | 3/2000 | Perona et al. |
| 6,052,130 A | 4/2000 | Bardon et al. |
| 6,054,941 A | 4/2000 | Chen |
| 6,054,990 A | 4/2000 | Tran et al. |
| 6,075,469 A | 6/2000 | Pong |
| 6,088,649 A | 7/2000 | Kadaba et al. |
| 6,094,197 A | 7/2000 | Buxton et al. |
| 6,098,034 A | 8/2000 | Razin et al. |
| 6,104,317 A | 8/2000 | Panagrossi |
| 6,104,384 A | 8/2000 | Moon et al. |
| 6,111,573 A | 8/2000 | Mccomb et al. |
| 6,130,962 A | 10/2000 | Sakurai |
| 6,144,764 A | 11/2000 | Yamakawa et al. |
| 6,148,104 A | 11/2000 | Wang et al. |
| 6,157,323 A | 12/2000 | Tso et al. |
| 6,157,379 A | 12/2000 | Singh |
| 6,157,958 A | 12/2000 | Armitage et al. |
| 6,169,538 B1 | 1/2001 | Nowlan et al. |
| 6,172,625 B1 | 1/2001 | Jin et al. |
| 6,188,988 B1 | 2/2001 | Barry et al. |
| 6,204,848 B1 | 3/2001 | Nowlan et al. |
| 6,212,297 B1 | 4/2001 | Sklarew |
| 6,215,485 B1 | 4/2001 | Phillips |
| 6,223,059 B1 | 4/2001 | Haestrup |
| 6,275,611 B1 | 8/2001 | Parthasarathy |
| 6,278,445 B1 | 8/2001 | Tanaka et al. |
| 6,285,768 B1 | 9/2001 | Ikeda |
| 6,286,064 B1 | 9/2001 | King et al. |
| 6,300,947 B1 | 10/2001 | Kanevsky |
| 6,307,548 B1 | 10/2001 | Flinchem et al. |
| 6,307,549 B1 | 10/2001 | King et al. |
| 6,314,418 B1 | 11/2001 | Namba |
| 6,320,943 B1 | 11/2001 | Borland |
| 6,346,894 B1 | 2/2002 | Connolly et al. |
| 6,362,752 B1 | 3/2002 | Guo et al. |
| 6,392,640 B1 | 5/2002 | Will |
| 6,424,743 B1 | 7/2002 | Ebrahimi |
| 6,424,983 B1 | 7/2002 | Schabes et al. |
| 6,437,709 B1 | 8/2002 | Hao |
| 6,448,987 B1 | 9/2002 | Easty et al. |
| 6,453,079 B1 | 9/2002 | Mcinerny |
| 6,489,951 B1 | 12/2002 | Wong et al. |
| 6,493,464 B1 | 12/2002 | Hawkins et al. |
| 6,502,118 B1 | 12/2002 | Chatterjee |
| 6,542,170 B1 | 4/2003 | Williams et al. |
| 6,549,219 B2 | 4/2003 | Selker |
| 6,567,072 B2 | 5/2003 | Watanabe |
| 6,585,162 B2 | 7/2003 | Sandbach et al. |
| 6,611,252 B1 | 8/2003 | Dufaux |
| 6,616,703 B1 | 9/2003 | Nakagawa |
| 6,643,647 B2 | 11/2003 | Natori |
| 6,646,573 B1 | 11/2003 | Kushler et al. |
| 6,654,733 B1 | 11/2003 | Goodman et al. |
| 6,686,852 B1 | 2/2004 | Guo |
| 6,686,907 B2 | 2/2004 | Su et al. |
| 6,711,290 B2 | 3/2004 | Sparr et al. |
| 6,757,544 B2 | 6/2004 | Rangarajan et al. |
| 6,765,554 B2 | 7/2004 | Millington |
| 6,765,567 B1 | 7/2004 | Roberson et al. |
| 6,801,190 B1 | 10/2004 | Robinson et al. |
| 6,801,659 B1 | 10/2004 | O'Dell |
| 6,807,529 B2 | 10/2004 | Johnson et al. |
| 6,819,315 B2 | 11/2004 | Toepke et al. |
| 6,820,075 B2 | 11/2004 | Shanahan et al. |
| 6,829,607 B1 | 12/2004 | Tafoya et al. |
| 6,864,809 B2 | 3/2005 | O'Dell et al. |
| 6,904,402 B1 | 6/2005 | Wang et al. |
| 6,912,581 B2 | 6/2005 | Johnson et al. |
| 6,947,771 B2 | 9/2005 | Guo et al. |
| 6,955,602 B2 | 10/2005 | Williams |
| 6,956,968 B1 | 10/2005 | O'Dell et al. |
| 6,970,599 B2 | 11/2005 | Longe et al. |

| Patent/Pub. No. | Date | Name |
|---|---|---|
| 6,973,332 B2 | 12/2005 | Mirkin et al. |
| 6,982,658 B2 | 1/2006 | Guo |
| 6,990,534 B2 | 1/2006 | Mikhailov et al. |
| 7,020,270 B1 | 3/2006 | Ghassabian |
| 7,020,849 B1 | 3/2006 | Chen |
| 7,030,863 B2 | 4/2006 | Longe et al. |
| 7,057,607 B2 | 6/2006 | Mayoraz et al. |
| 7,075,520 B2 | 7/2006 | Williams |
| 7,088,345 B2 | 8/2006 | Robinson et al. |
| 7,088,861 B2 | 8/2006 | Van Meurs |
| 7,095,403 B2 | 8/2006 | Lyustin |
| 7,107,204 B1 | 9/2006 | Liu et al. |
| 7,117,144 B2 | 10/2006 | Goodman et al. |
| 7,139,430 B2 | 11/2006 | Sparr et al. |
| 7,149,550 B2 | 12/2006 | Kraft et al. |
| 7,151,533 B2 | 12/2006 | Van Ieperen |
| 7,155,683 B1 | 12/2006 | Williams |
| 7,162,305 B2 | 1/2007 | Tong et al. |
| 7,177,797 B1 | 2/2007 | Micher et al. |
| 7,224,989 B2 | 5/2007 | Kraft |
| 7,256,769 B2 | 8/2007 | Pun et al. |
| 7,257,528 B1 | 8/2007 | Ritchie et al. |
| 7,272,564 B2 | 9/2007 | Phillips et al. |
| 7,275,029 B1 | 9/2007 | Gao et al. |
| 7,277,088 B2 | 10/2007 | Robinson et al. |
| 7,283,999 B1 | 10/2007 | Ramesh et al. |
| 7,286,115 B2 | 10/2007 | Longe |
| 7,293,231 B1 | 11/2007 | Gunn et al. |
| 7,313,277 B2 | 12/2007 | Morwing et al. |
| 7,349,576 B2 | 3/2008 | Holtsberg |
| 7,385,531 B2 | 6/2008 | Zhang et al. |
| 7,389,235 B2 | 6/2008 | Dvorak |
| 7,437,001 B2 | 10/2008 | Morwing et al. |
| 7,453,439 B1 | 11/2008 | Kushler et al. |
| 7,466,859 B2 | 12/2008 | Chang et al. |
| 7,584,173 B2 | 9/2009 | Bax et al. |
| 7,720,682 B2 | 5/2010 | Stephanick et al. |
| 7,750,891 B2 * | 7/2010 | Stephanick et al. ........... 345/173 |
| 7,778,818 B2 | 8/2010 | Longe et al. |
| 7,821,503 B2 * | 10/2010 | Stephanick et al. ........... 345/173 |
| 7,880,730 B2 | 2/2011 | Robinson et al. |
| 7,920,132 B2 | 4/2011 | Longe et al. |
| 8,237,681 B2 * | 8/2012 | Stephanick et al. ........... 345/173 |
| 8,237,682 B2 * | 8/2012 | Stephanick et al. ........... 345/173 |
| 2001/0033295 A1 | 10/2001 | Phillips |
| 2001/0048425 A1 | 12/2001 | Partridge |
| 2002/0093491 A1 | 7/2002 | Allen et al. |
| 2002/0122072 A1 | 9/2002 | Selker |
| 2002/0135499 A1 | 9/2002 | Guo |
| 2002/0135561 A1 | 9/2002 | Rojewski |
| 2002/0145587 A1 | 10/2002 | Watanabe |
| 2002/0163544 A1 | 11/2002 | Baker et al. |
| 2002/0168107 A1 | 11/2002 | Tang et al. |
| 2002/0188448 A1 | 12/2002 | Goodman et al. |
| 2003/0006956 A1 | 1/2003 | Wu et al. |
| 2003/0011574 A1 | 1/2003 | Goodman |
| 2003/0023426 A1 | 1/2003 | Pun et al. |
| 2003/0033288 A1 | 2/2003 | Shanahan et al. |
| 2003/0048257 A1 | 3/2003 | Mattila |
| 2003/0054830 A1 | 3/2003 | Williams et al. |
| 2003/0144830 A1 | 7/2003 | Williams |
| 2003/0179930 A1 | 9/2003 | O'Dell et al. |
| 2003/0184451 A1 | 10/2003 | Li |
| 2003/0234766 A1 | 12/2003 | Hildebrand |
| 2004/0153963 A1 | 8/2004 | Simpson et al. |
| 2004/0153975 A1 | 8/2004 | Williams et al. |
| 2004/0155869 A1 | 8/2004 | Robinson et al. |
| 2004/0163032 A1 | 8/2004 | Guo et al. |
| 2004/0243389 A1 | 12/2004 | Thomas et al. |
| 2004/0260694 A1 | 12/2004 | Chaudhuri et al. |
| 2005/0060138 A1 | 3/2005 | Wang et al. |
| 2005/0114770 A1 | 5/2005 | Sacher et al. |
| 2005/0120870 A1 | 6/2005 | Ludwig |
| 2005/0135678 A1 | 6/2005 | Wecker et al. |
| 2005/0169527 A1 | 8/2005 | Longe et al. |
| 2005/0174333 A1 | 8/2005 | Robinson et al. |
| 2005/0190970 A1 | 9/2005 | Griffin |
| 2005/0210383 A1 | 9/2005 | Cucerzan et al. |
| 2005/0223308 A1 | 10/2005 | Gunn et al. |
| 2006/0062461 A1 | 3/2006 | Longe et al. |
| 2006/0129928 A1 | 6/2006 | Qiu |
| 2006/0136408 A1 | 6/2006 | Weir et al. |
| 2006/0155536 A1 | 7/2006 | Williams et al. |
| 2006/0158436 A1 | 7/2006 | Lapointe et al. |
| 2006/0173807 A1 | 8/2006 | Weir et al. |
| 2006/0176283 A1 | 8/2006 | Suraqui |
| 2006/0190819 A1 | 8/2006 | Ostergaard et al. |
| 2006/0193519 A1 | 8/2006 | Sternby |
| 2006/0236239 A1 | 10/2006 | Simpson et al. |
| 2006/0239560 A1 | 10/2006 | Sternby |
| 2006/0247915 A1 | 11/2006 | Bradford et al. |
| 2006/0274051 A1 | 12/2006 | Longe et al. |
| 2007/0016616 A1 | 1/2007 | Brill |
| 2007/0040813 A1 | 2/2007 | Kushler |
| 2007/0050360 A1 | 3/2007 | Hull et al. |
| 2007/0094718 A1 | 4/2007 | Simpson |
| 2007/0203879 A1 | 8/2007 | Templeton-Steadman et al. |
| 2007/0203894 A1 | 8/2007 | Jones et al. |
| 2007/0276653 A1 | 11/2007 | Greenwald et al. |
| 2007/0276814 A1 | 11/2007 | Williams |
| 2007/0285397 A1 | 12/2007 | Lapointe et al. |
| 2008/0100579 A1 | 5/2008 | Robinson et al. |
| 2008/0130996 A1 | 6/2008 | Sternby |
| 2008/0133222 A1 | 6/2008 | Kogan et al. |
| 2008/0189605 A1 | 8/2008 | Kay et al. |
| 2008/0291059 A1 | 11/2008 | Longe |
| 2009/0007001 A1 | 1/2009 | Morin et al. |
| 2009/0037399 A1 | 2/2009 | Bartz et al. |
| 2009/0089665 A1 | 4/2009 | White et al. |
| 2009/0105959 A1 | 4/2009 | Braverman et al. |
| 2009/0168768 A1 | 7/2009 | Chiabaut et al. |
| 2009/0226098 A1 | 9/2009 | Takahashi et al. |
| 2009/0234826 A1 | 9/2009 | Bidlack |
| 2009/0284471 A1 | 11/2009 | Longe et al. |
| 2010/0082343 A1 | 4/2010 | Levit et al. |
| 2010/0257478 A1 | 10/2010 | Longe et al. |
| 2010/0325136 A1 | 12/2010 | Chaudhuri et al. |
| 2011/0193797 A1 | 8/2011 | Unruh |
| 2011/0234524 A1 | 9/2011 | Longe |

FOREIGN PATENT DOCUMENTS

| | | |
|---|---|---|
| CN | 1232204 A | 10/1999 |
| CN | 1358299 | 7/2002 |
| CN | 1606753 | 4/2005 |
| DE | 3401942 | 11/1984 |
| EP | 0114250 A2 | 8/1984 |
| EP | 0739521 | 10/1996 |
| EP | 0762265 A2 | 3/1997 |
| EP | 0858023 A2 | 8/1998 |
| EP | 0961208 A1 | 12/1999 |
| EP | 1018679 A2 | 7/2000 |
| EP | 1085401 A1 | 3/2001 |
| EP | 1168780 A2 | 1/2002 |
| EP | 1355225 A1 | 10/2003 |
| FR | 2824979 A1 | 11/2002 |
| JP | 05-7010832 | 1/1982 |
| JP | 60-204065 | 10/1985 |
| JP | 60204065 | 10/1985 |
| JP | 62065136 | 3/1987 |
| JP | 1023021 | 1/1989 |
| JP | 1047565 | 2/1989 |
| JP | 05-027896 | 2/1993 |
| JP | 1993081482 | 4/1993 |
| JP | 05-233600 | 9/1993 |
| JP | 6083512 | 3/1994 |
| JP | 6083816 | 3/1994 |
| JP | 1994083512 | 3/1994 |
| JP | 1994083816 | 3/1994 |
| JP | 7094376 | 4/1995 |
| JP | 7146918 | 6/1995 |
| JP | 1995146918 | 6/1995 |
| JP | 8305701 | 11/1996 |
| JP | 1996305701 | 11/1996 |
| JP | 8319721 | 12/1996 |
| JP | 09-185612 | 7/1997 |
| JP | 9185612 | 7/1997 |
| JP | 10-143309 | 5/1998 |
| JP | 10135399 | 5/1998 |

| | | |
|---|---|---|
| JP | 10143309 | 5/1998 |
| JP | 10-154144 | 6/1998 |
| JP | 10154144 | 6/1998 |
| JP | 10275046 | 10/1998 |
| JP | 11021274 | 1/1999 |
| JP | 11028406 | 2/1999 |
| JP | 11338858 | 12/1999 |
| JP | 1999338858 | 12/1999 |
| JP | 2001043205 | 2/2001 |
| JP | 2001282778 | 10/2001 |
| JP | 2002244803 | 8/2002 |
| JP | 2003005888 | 1/2003 |
| JP | 2003500771 | 1/2003 |
| JP | 2003533816 | 11/2003 |
| KR | 20010107388 | 12/2001 |
| KR | 20020004419 | 1/2002 |
| TW | 498264 B | 8/2002 |
| WO | WO9705541 A1 | 2/1997 |
| WO | WO9816889 | 4/1998 |
| WO | WO9915952 A2 | 4/1999 |
| WO | WO00/72300 A1 | 11/2000 |
| WO | WO00/74240 A1 | 12/2000 |
| WO | WO0188680 | 11/2001 |
| WO | WO0188680 A1 | 11/2001 |
| WO | WO-03/021788 | 3/2003 |
| WO | WO2004111812 A2 | 12/2004 |
| WO | WO2004111871 A1 | 12/2004 |
| WO | WO2006026908 A1 | 3/2006 |

OTHER PUBLICATIONS

"Pilot POBox (Jul. 1997)", http://www.csl.sony.co.jp/person/maui/POBox/ilot.html, Printout form dated Jan. 3, 2000, no translation provided, 7 pages.

"POBox Example 2", http://www.csl.sony..co.jp/person/masui/POBox/example2.html, Printout form dated Jan. 3, 2000, no translation provided, 2 pages.

"Quick Stroke Information", Synaptics, retrieved on Nov. 18, 2006 from website: www.synaptics.com/products/quickstroke_faq.cfm and www.synaptics.com/products/quickstroke.cfm, 4 pages.

"Softava Q12 Mobile's Keypad", http://www.softava.com/q12, Printout dated Oct. 24, 2006, 3 pages.

"What is Fastap; What Fastap Does; How it Works", retrieved online on Oct. 24, 2006 from url: www.digitwireless.com, 3 pages.

Amin, A. et al., "Recognition of Hand-printed Chinese Characters Using Decision Trees/Machine Learning of C4.5 System", Pattern Analysis and Applications, vol. 1, Issue 2, 1998, 130-141.

Arnott, John , "Probabilistic Character Disambiguation for Reduced Keyboards Using Small Text Samples", AAC Augmentative and Alternative Communication, vol. 8, No. 3, Dept. Math & comp. Sci.; Univ of Dundee, Dundee, Tayside, Scotland, Sep. 1992, 215-223.

Chen, Ju-Wei et al., "A Hierarchical Representation for the Reference Database of On-Line Chinese Character Recognition", Advances in Structural and Syntactical Pattern Recognition. 6th International Workshop,, INSPEC Abstract No. C9702-1250B-021, 6th International Workshop, SSPR '96, Aug. 20-23, 1996, 1 page.

Cheng, R et al., "Recognition of Radicals in Handwritten Chinese Characters by Means of Problem Reduction and Knowledge Guidance", International Journal of Pattern Recognition and Artificial Intelligence, INSPEC Abstract No. C9706-5260B-280, Sep. 1996, 1 page.

Chou, Kuo-Sen et al., "Radical-Based Neighboring Segment Matching for On-Line Chinese Character Recognition", Computer Processing of Oriental Languages, INSPEC Abstract No. B9701-6140C-682, C9701-1250B-019, Apr. 1997, 1 page.

Chou, Kuo-Sen et al., "Radical-Based Neighboring Segment Matching for On-Line Chinese Character Recognition", Proceedings of the 13th International Conference on Pattern Recognition, INSPEC Abstract No. B9701-6140C-682, C9701-1250B-019, Aug. 25-26, 1996, 1 page.

Connell, S. et al., "Template-based Online Character Recognition", Department of Computer Science and Engineering, Michigan State University, East Lansing, Michigan, Aug. 10, 1999, 1-30.

Fan, Fang et al., "An On-Line Handwritten Chinese Character Recognition System", Proceedings of the SPIE—The International Society for Optical Engineering, INSPEC Abstract No. C2000-12-5260B-085, Jan. 26-27, 2000, 1 page.

Garrett, M. et al., "Implementation of Dasher, an Information Efficient Input Mechanism", Presented at LINUX 2003 Conference, D. Ward, I. Murray, P. Cowans, and D. Mackay (Additional Authors), Edinburgh, Scotland, Jul. 11, 2003, 6 pages.

Hung, Kwok-Wah et al., "Boxing Code for Stroke-Order Free Handprinted Chinese Characters Recognition", Proceedings of IEEE International Conference on Systems, Man, Cybernetics, INSPEC Abstract No. C2001-01-5260B-087, Oct. 8-11, 2000, 1 page.

Isokoski, P. et al., "Architecture for Personal Text Entry Methods", In Closing the Gap: Software Engineering and Human-Computer Interaction, IFIP, 2003, 1-8.

Isokoski, P. et al., "Combined Model for Text Entry Rate Development", CHI2003 Extended Abstracts, Apr. 5-10, 2003, 752-753.

Isokoski, P. et al., "Comparison of Two Touchpad-Based Methods for Numeric Entry", CHI Letters: Human Factors in Computing Systems, CHI 2002, vol. 4 No. 1, Apr. 20-25, 2002, 25-32.

Isokoski, P. et al., "Device Independent Text Input: A Rationale and an Example", Proceedings of the Working Conference on Advanced Visual Interfaces AVI2000, May 23-26, 2000, Palermo, Italy, 76-83.

Isokoski, P. , "Model for Unistroke Writing Time", CHI Letters: Human Factors in Computing Systems, SIGCHI 2001, vol. 3, No. 1, Mar. 31-Apr. 5, 2001, 357-364.

Isokoski, P. et al., "Report on the CHI2001 Workshop on Text Entry on Mobile Systems", SIGCHI Bulletin, MacKenzie, S. I. (Additional Author), Sep./Oct. 2001, 14.

Isokoski, P. et al., "Text Entry on Mobile Systems: Directions for the Future", CHI 2001 Extended Abstracts, Mar. 31-Apr. 5, 2001, 495.

Isokoski, P. , "Text Input Methods for Eye Trackers Using Off-Screen Targets", In Proceedings of Eye Tracking Research & Applications Symposium 2000, ACM, Nov. 6-8, 2000, 15-21.

Kim, Ki-Cheol et al., "On-Line Recognition of Stroke-Order Free Cursive Chinese Characters with Relaxation Matching", Journal of the Korea Information Science Society, NSPEC Abstract No. C9507-1250B-022, Mar. 1995, 1 page.

Kristensson, et al., "Relaxing Stylus Typing Precision by Geometric Pattern Matching", ACM Proc. of the 10th Int'l Conf. on Intelligent User Interfaces, Jan. 9, 2005, pp. 151-158.

Kukich, Karen , "Techniques for Automatically Correcting Words in Text", ACM Computing Surveys, vol. 24, Dec. 1992, 377-439.

Li, Xiaolin et al., "On-Line Handwritten Alphanumeric Character Recognition Using Feature Sequences", Department of Computer Science, Hong Kong University of Science and Technology, Clear Water Bay, Kowloon, Hong Kong, 1995, 8 pages.

Lin, Chang-Keng et al., "Stroke-Order Independent On-Line of Handwritten Chinese Characters", Proceedings of the SPIE—The International Society for Optical Engineering, INSPEC Abstract No. C90031813, Nov. 8-10, 1989, 1 page.

Liu, J.Z. et al., "Two-layer Assignment Method for Online Chinese Character Recognition", EEE Proceedings—Vision, Image and Signal Processing, INSPEC Abstract No. C2000-06-1250B-004, Feb. 2000, 1 page.

Liu, Jianzhuang et al., "Stroke Order and Stroke Number Free On-Line Chinese Character Recognition Using Attributed Relational Graph Matching", Proceedings of the 13th International Conference on Pattern Recognition, INSPEC Abstract No. C9701-1250B-035, Aug. 25-29, 1996, 1 page.

Mankoff, Jennifer , "Cirrin: A Word-Level Unistroke Keyboard for Pen Input", Proceedings of UIST 1998, Abowd, Gregory D.(Additional Author), Technical note, Nov. 1-4, 1998, 213-214.

Mankoff, Jennifer , "Error Correction Techniques for Handwriting, Speech and other Ambiguous or Error Prone Systems", GVU TechReport, Abowd, Gregory D. (Additional Author), GIT-GVU-99-18, Jun. 1999, Total of 9 pages.

Masui, T. , "An Efficient Text Input method for Pen-based Computers", Proceedings of the ACM Conf. on Human Factors in Computing Systems, ACM Press, Apr. 1998, 238-335.

Masui, T. , "POBox: An Efficient Text Input Method for Handheld and Ubiquitous Computers", Sony Computer Science Laboratories, Apr. 1998, 12 pages.

Min, Kyongho, "Syntactic Recovery and Spelling Correction of Ill-formed Sentences", School of Computer Science and Engineering, Wilson, William H. (Additional Author), The University of New South Wales, Feb. 1998, 1-10.

Mollineda, et al., "A Windowed Weighted Approach for Approximate Cyclic String Matching", Google, Presented at the 16th Int'l Conference on Pattern Recognition, Aug. 11, 2002, pp. 188-191.

Naito, S. et al., "Rough Classification for Handprinted Chinese Characters by Stroke Density", Transactions of the Institute of Electronics and Communication Engineers of Japan, INSPEC Abstract No. C82009693, Aug. 1981, 1 page.

Nambu, H. et al., "On-Line Chinese Handwriting Character Recognition: Comparison with Japanese Kanji Recognition and Improvement of Input Efficiency", Transactions of the Information Processing Society of Japan, NSPEC Abstract No. B2000-01-6135E-035, C2000-01-5260B-099, Aug. 1999, 1 page.

Odaka, K. et al., "Stroke Order Free On-Line Handwritten Character Recognition of Algorithm", Transactions of the Institute of Electronics and Communication Engineers of Japan, Section E, INSPEC Abstract No. C82041007, Jun. 1982, 1 Page.

Pan, Bao-Chang et al., "Recognition of Handprinted Chinese Characters by Stroke Order Codes", International Conference on Computer Processing of Chinese and Oriental Languages, INSPEC Abstract No. C89024386, Aug. 29-Sep. 1, 1988, 1 page.

Park, Hee-Seon et al., "An On-line Recognition System for Cursive Chinese Characters with Effective Coarse Classification and Elastic Matching", Journal of the Korea Information Science Society, INSPEC Abstract No. C9404-1250B-001, Sep. 1993.

Perlin, K., "Quikwriting: Continuous Stylus-Based Text Entry", Presented at ACM UIST'98 Conference, Nov. 1-4, 1998, 215-216.

Quixal, et al., "Strategies for the generation of individualized feedback in distance language learning", Google 2007, pp. 1-8.

Romero, R. et al., "Optical Chinese Character Recognition using Probabilistic Neural Networks", Imaging Systems Lab, Robotics Institute, Carnegie Mellon University, Pittsburgh, PA, Jul. 1996, 1-18.

Sarr, , "Improving Precision and Recall using a Spellchecker in a Search Engine", Master's Thesis, Google 2003, pp. 1-39.

Seni, G. et al., "Large Vocabulary Recognition of On-Line Handwritten Cursive Words", Presented at IEEE Transactions on Pattern Analysis and Machine Intelligence, Jun. 1996, 1-6.

Shin, J., "Online Handwriting Character Analysis Using Stroke Correspondence Search", Journal of Shanghai University, Aizu University, Fukushima, Japan, INSPEC Abstract No. C2001-11-1250B-012, Sep. 2001, 1 page.

Srihari, S. et al., "Cherry Blossom: A System for Japanese Character Recognition", Center for Excellence for Document Analysis and Recognition, State University of New York at Buffalo, Buffalo, NY, 1997, 15 pages.

Stockton, R. et al., "JKanji: Wavelet-based Interactive Kanji Competition", Proceedings of the 15th International Conference on Pattern Recognition, Sep. 3-7, 2000, 1 page.

Vuurpijl, L. et al., "Coarse Writing-Style Clustering Based on Simple Stroke-Related Features", Institute for Cognition and Information, University of Nijmegen, Nijmegen, The Netherlands, 1997, 6 pages.

Zhai, Shumin, "Shorthand Writing on Stylus Keyboard", CHI 2003, Kristensson, Per-Ola (Additional Author), vol. 5 No. (1), 2003, 97-104.

Zheng, Jing et al., "Recognizing On-Line Handwritten Chinese Character Via FARG Matching", Proceedings of the Fourth International Conference on Document Analysis and Recognition, Aug. 18-20, 1997, INSPEC Abstract No. B9711-6140C-162, C971-5260B-123, page.

* cited by examiner

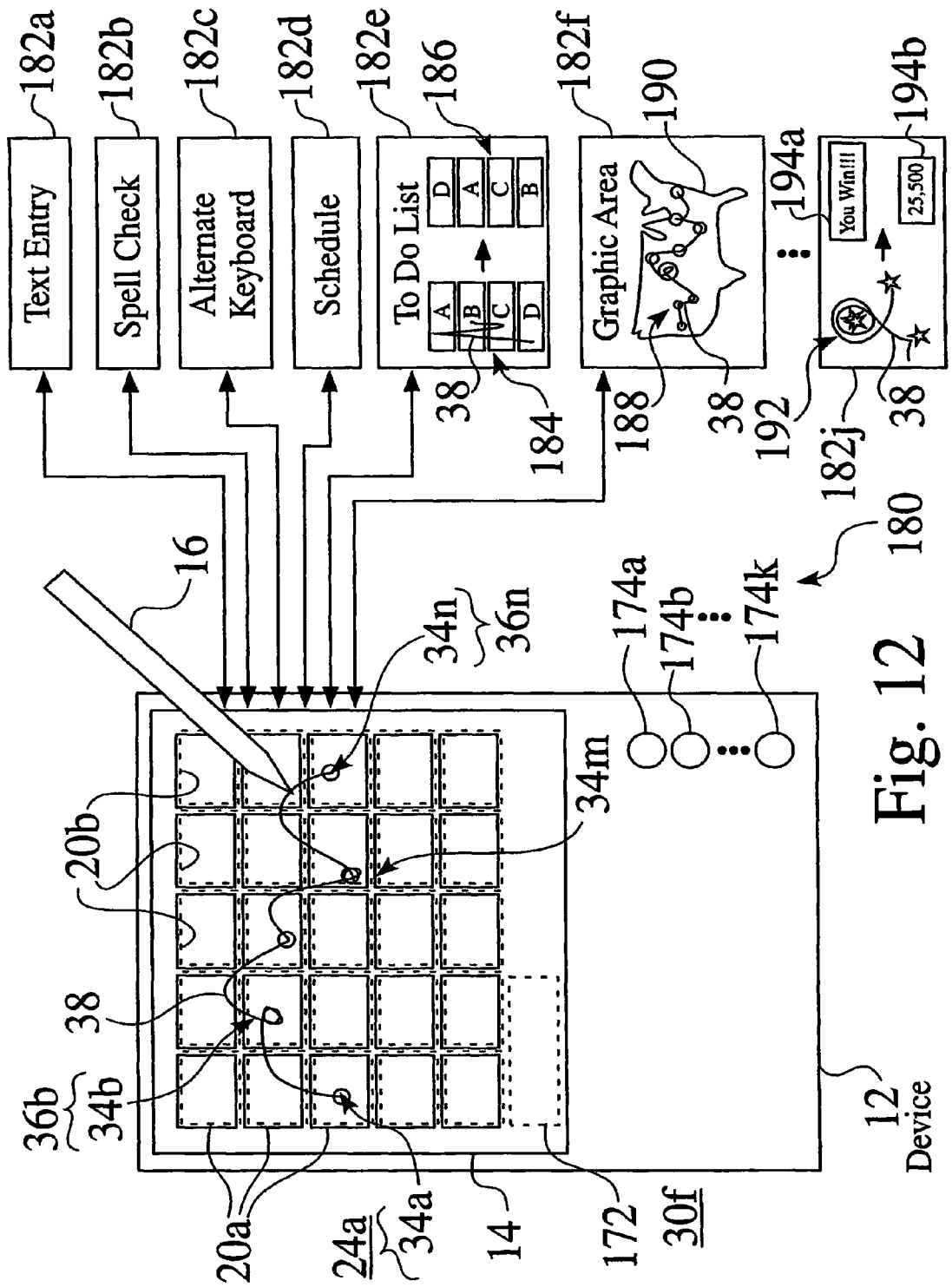

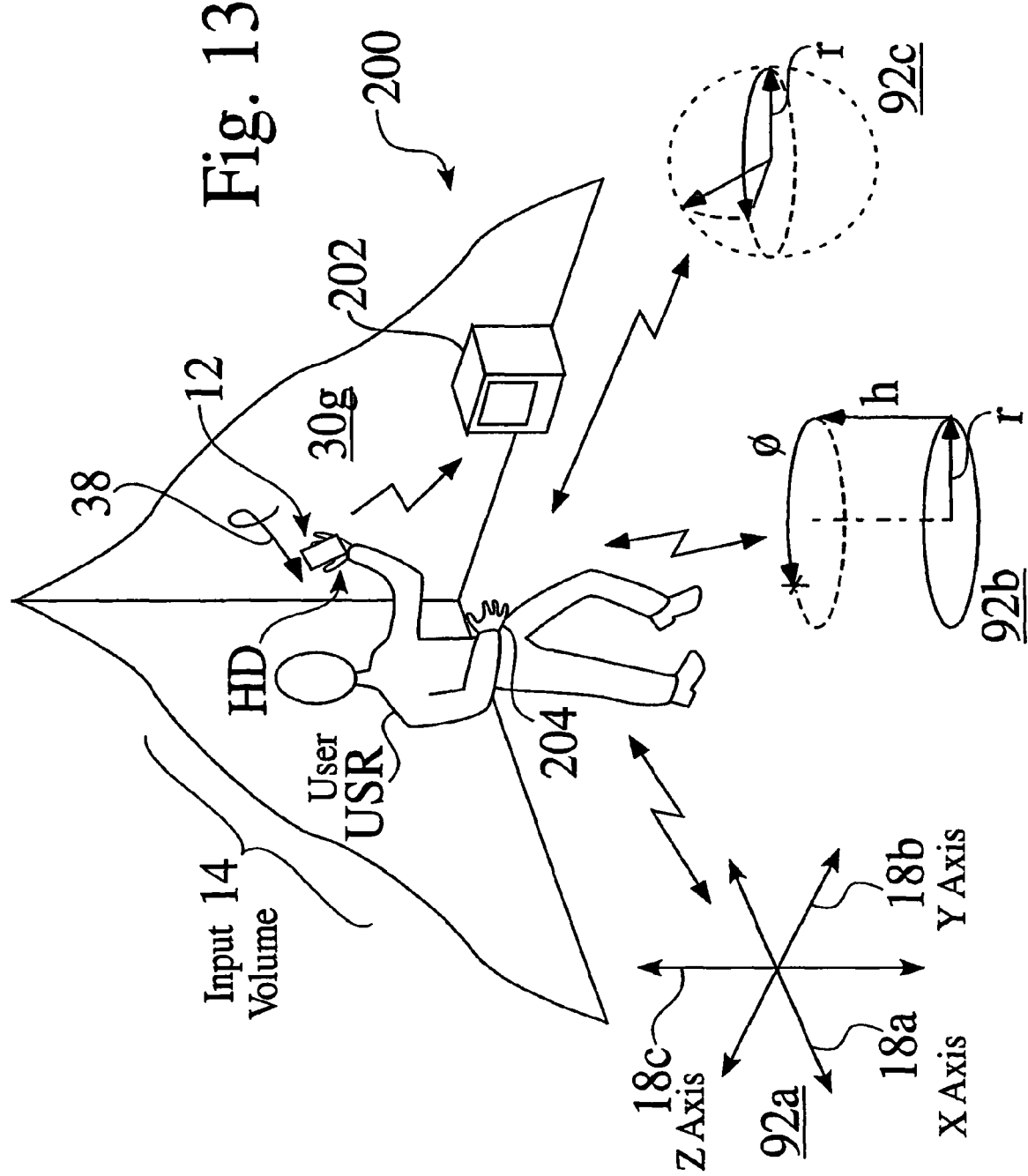

SYSTEM AND APPARATUS FOR SELECTABLE INPUT WITH A TOUCH SCREEN

CROSS REFERENCE TO RELATED APPLICATIONS

This application is a Continuation of U.S. patent application Ser. No. 12/910,684, filed 22 Oct. 2010, entitled SYSTEM AND PROCESS FOR SELECTABLE INPUT WITH A TOUCH SCREEN, which issued as U.S. Pat. No. 8,237,682 on 7 Aug. 2012, which is a Continuation of U.S. patent application Ser. No. 12/463,635, filed 11 May 2009, entitled TOUCH SCREEN AND GRAPHICAL USER INTERFACE, which issued as U.S. Pat. No. 7,821,503 on 26 Oct. 2010, which is a Divisional of U.S. patent application Ser. No. 10/881,819, filed 28 Jun. 2004, entitled SELECTIVE INPUT SYSTEM BASED ON TRACKING OF MOTION PARAMETERS OF AN INPUT DEVICE, which issued as U.S. Pat. No. 7,750,891 on 6 Jul. 2010, which claims priority to U.S. Provisional Patent Application Ser. No. 60/504,552, filed 19 Sep. 2003, to U.S. Provisional Patent Application Ser. No. 60/461,735, filed 9 Apr. 2003, and is a Continuation-in-Part of U.S. application Ser. No. 10/677,890, filed 1 Oct. 2003, entitled DIRECTIONAL INPUT SYSTEM WITH AUTOMATIC CORRECTION, which issued as U.S. Pat. No. 7,286,115 on 23 Oct. 2007, which claims priority to U.S. Provisional Patent Application Ser. No. 60/461,735, filed 9 Apr. 2003, is a Continuation-in-Part of U.S. application Ser. No. 10/205,950, filed 25 Jul. 2002, entitled CHINESE CHARACTER HANDWRITING RECOGNITION SYSTEM, which issued as U.S. Pat. No. 6,970,599 on 29 Nov. 2005, and is a Continuation-in-Part of U.S. application Ser. No. 09/580,319, filed 26 May 2000, entitled KEYBOARD SYSTEM WITH AUTOMATIC CORRECTION, which issued as U.S. Pat. No. 6,801,190 on 5 Oct. 2004, which claims priority to U.S. Provisional Patent Application Ser. No. 60/136,613, filed 27 May 1999, each of which is incorporated herein in its entirety by this reference thereto.

The Application is also related to U.S. application Ser. No. 12/830,185, filed 2 Jul. 2010, entitled SELECTIVE INPUT SYSTEM AND PROCESS BASED ON TRACKING OF MOTION PARAMETERS OF AN INPUT OBJECT, which issued as U.S. Pat. No. 8,237,681 on 7 Aug. 2012, which is a Continuation Application of U.S. patent application Ser. No. 10/881,819, filed 28 Jun. 2004, entitled SELECTIVE INPUT SYSTEM BASED ON TRACKING OF MOTION PARAMETERS OF AN INPUT DEVICE, which issued as U.S. Pat. No. 7,750,891 on 6 Jul. 2010, which claims priority to U.S. Provisional Patent Application Ser. No. 60/504,552, filed 19 Sep. 2003, to U.S. Provisional Patent Application Ser. No. 60/461,735, filed 9 Apr. 2003, and is a Continuation-in-Part of U.S. application Ser. No. 10/677,890, filed 1 Oct. 2003, entitled DIRECTIONAL INPUT SYSTEM WITH AUTOMATIC CORRECTION, which issued as U.S. Pat. No. 7,286,115 on 23 Oct. 2007, which claims priority to U.S. Provisional Patent Application Ser. No. 60/461,735, filed 9 Apr. 2003, is a Continuation-in-Part of U.S. application Ser. No. 10/205,950, filed 25 Jul. 2002, entitled CHINESE CHARACTER HANDWRITING RECOGNITION SYSTEM, which issued as U.S. Pat. No. 6,970,599 on 29 Nov. 2005, and is a Continuation-in-Part of U.S. application Ser. No. 09/580,319, filed 26 May 2000, entitled KEYBOARD SYSTEM WITH AUTOMATIC CORRECTION, which issued as U.S. Pat. No. 6,801,190 on 5 Oct. 2004, which claims priority to U.S. Provisional Patent Application Ser. No. 60/136,613, filed 27 May 1999.

This application is also related to PCT Application No. PCT/US04/22916, filed on 16 Jul. 2004, which claims priority to U.S. patent application Ser. No. 10/881,819, filed 28 Jun. 2004, entitled SELECTIVE INPUT SYSTEM BASED ON TRACKING OF MOTION PARAMETERS OF AN INPUT DEVICE, which issued as U.S. Pat. No. 7,750,891 on 6 Jul. 2010, to U.S. application Ser. No. 10/677,890, filed 1 Oct. 2003, entitled DIRECTIONAL INPUT SYSTEM WITH AUTOMATIC CORRECTION, which issued as U.S. Pat. No. 7,286,115 on 23 Oct. 2007, and to U.S. Provisional Patent Application Ser. No. 60/504,552, filed 19 Sep. 2003.

This application is also related to PCT Application No. PCT/US04/11343, filed on 9 Apr. 2004, which claims the benefit of U.S. application Ser. No. 10/677,890, filed 1 Oct. 2003, entitled DIRECTIONAL INPUT SYSTEM WITH AUTOMATIC CORRECTION, which issued as U.S. Pat. No. 7,286,115 on 23 Oct. 2007, and to U.S. Provisional Patent Application Ser. No. 60/461,735, filed 9 Apr. 2003. The Applicants hereby rescind any disclaimer of claim scope in the parent application(s) or the prosecution history thereof and advises the USPTO that the claims in this application may be broader than any claim in the parent application(s).

FIELD OF THE INVENTION

The invention relates to input devices and user interfaces. More particularly, the invention relates to the tracking of the position and/or motion of an input device and selection of items or character input based on the tracking.

BACKGROUND OF THE INVENTION

Input devices often comprise means for pointing or selecting, such as by a stylus, finger, or mouse, whereby a user may interact with a device. The user is often required to interact with a user interface, such as a keypad, touchpad, or touch screen, such as to input a desired character. A user typically maneuvers the pointing or selection device over a desired position over the interface, and then taps or sets the pointing device, to activate a chosen region or element, e.g. such as an actual or mapped keypad element or character.

A user is often required to perform a large number of selective pointing actions, which can be difficult to perform, and are prone to error.

Furthermore, the user interfaces for many devices are often small, such as for small electronic devices, e.g. portable cell phones, personal digital assistants (PDAs), or other devices often used for business, personal, educational, or recreational purposes. The selective pointing functions required to operate such small devices have become increasingly difficult and prone to error, as a user must accurately tap on a very small region within a user interface.

Several structures and methods have been described, to facilitate the entry of information within stylus-based devices.

For example, in a Palm personal digital assistant (PDA), available through Palm Inc., of Milpitas, Calif., a handwriting recognition system, such as Graffiti®, is provided, wherein a user, preferably with a stylus, enters shorthand-style simplified patterns within a designated entry region of an input screen. Entered motions are analyzed to determine the entered characters, which are then placed within an "active" or cursor region for the device. For example, for a cursor location corresponding to time, e.g. 2:30 PM, within a schedule application, a user may enter "Meet with Fred".

Shumin Zhai and Per-Ola Kristensson, Shorthand Writing on Stylus Keyboard, Apr. 5-10, 2003, describe a method for computer-based writing, wherein a shorthand symbol is provided and taught for each word, according to a pattern on a stylus keyboard. A gesture pattern is typically made by tapping the first letter of a word, and gliding the stylus over to subsequent characters in a word. A word is recognized by the pattern of the gesture over the keyboard.

Jennifer Mankoff and Gregory D. Abowd, Error Correction Techniques, submitted to Interact '99, provides a survey of the "design, implementation, and study of interfaces for correcting error prone input technologies".

Jennifer Mankoff and Gregory D. Abowd, Cirrin: A Word-Level Unistroke Keyboard for Pen Input, Proceedings of UIST 1998, Technical note. pp. 213-214, describe a structure and method for planar entry of words, with a non-planar motion typically used between words. Keyboard designs are described, in which letters are arranged about the periphery of a neutral area. Each word is begun by starting a stylus path within a central, i.e. neutral region. A user is then required to trace out a path which crosses, i.e. travels through, selected letters, while entering the central, neutral region as necessary, between successive letters.

K. Perlin, Quikwriting: *Continuous Stylus-Based Text Entry*; presented at ACM UIST'98 Conference, describes a shorthand for entering text, wherein the x,y positions of a stylus on a surface are tracked. The surface includes nine zones, including a central resting zone. A token is created whenever the stylus enters or exits any of the zones, and the sequence of tokens is used to determine the entered characters. The system typically requires that the stylus begin each word from a central resting zone. The system also often requires movement between two zones for the determined selection of most characters, while for characters which are defined to be "frequent", the movement from a central resting zone to an outer zone and back to the resting zone can be used.

M. Garrett, D. Ward, I. Murray, P. Cowans, and D. Mackay, *Implementation of Dasher, an Information Efficient Input Mechanism*, presented at LINUX 2003 Conference, Edinburgh, Scotland, describe a text entry system which uses "a language model to offer predictions to the user without constraining the range of words which can be written", such as for "providing input on keyboardless devices and for disabled users". The input system presents letters which move across a screen, wherein a user navigates a cursor into the zones for each letter. Zones for common letters, based on letters and words already presented, are bigger.

Other work describing text input technologies is provided by P. Isokoski and R. Raisamo, Device Independent Text Input: A Rationale and an Example, Proceedings of the Working Conference on Advanced Visual Interfaces AVI2000, pages 76-83, Palermo, Italy, 2000; P. Isokoski, *Text Input Methods for Eye Trackers Using Off-Screen Targets*, In *Proceedings of Eye Tracking Research & Applications Symposium* 2000, pages 15-22. ACM, 2000; P. Isokoski, *Model for Unistroke Writing Time*, CHI Letters: Human Factors in Computing Systems, CHI 2001, 3(1):357-364, 2001; P. Isokoski and M. Käki. *Comparison of Two Touchpad-Based Methods for Numeric Entry*, CHI Letters: Human Factors in Computing Systems, CHI 2002, 4(1): 25-32, 2002; P. Isokoski and I. Scott MacKenzie, *Text Entry on Mobile Systems: Directions for the Future*, CHI 2001 Extended Abstracts, page 495, 2001; P. Isokoski and I. S. MacKenzie; *Report on the CHI2001 Workshop on Text Entry on Mobile Systems*, SIGCHI Bulletin, p. 14, September/October 2001; P. Isokoski and I. S. MacKenzie. *Combined Model for Text Entry Rate Development*, CHI2003 Extended Abstracts, pp. 752-753, 2003; P. Isokoski and R. Raisamo, *Architecture for Personal Text Entry Methods*, In *Closing the Gaps: Software Engineering and Human-Computer Interaction*, pp. 1-8. IFIP, 2003.

While such entry systems provide a means for entering information, the required shorthand or stylus paths are often complex, and movements required for one character are easily mistaken for different characters. A user is therefore often required to retype one or more characters, if the mistakes are even noticed.

It would be advantageous to provide an input system that makes selection or character input based on determined motions of input device over an area, i.e. the individual characteristic motions which, as a whole, make up a pattern. The development of such a user input system would constitute a major technological advance.

It would also be advantageous to provide a user input system, wherein selections of items or characters are determined, i.e. distinguished, by detecting parameters of motion of an input device, such as length of motion, a change in direction, a change in velocity, and/or a pause in motion, at locations that correspond to features on the keyboard/pad. The development of such a user input system would constitute a major technological advance.

As well, it would be advantageous to provide an input system which makes selection or character input based on the motion of input device over an area, which is coupled to a text disambiguation system such as T9® or SloppyType™ system, to improve the accuracy and usability of the input system. The development of such a user input system would constitute a further major technological advance.

SUMMARY OF THE INVENTION

A selective input system and associated method are provided, which track the motion of an input device over an area. The input device can be a touchpad, a mouse, a pen, or any device capable of providing a location, e.g. such as an x-y location and/or a location based on alternate or additional dimensions. The area is preferably augmented with a printed or actual keyboard/pad. Alternatively, a representation of the location of the input device over a virtual keyboard/pad can be dynamically shown on an associated display. The system identifies selections of items or characters by detecting parameters of motion of the input device, such as length of motion, a change in direction, a change in velocity, and or a lack of motion at locations that correspond to features on the keyboard/pad. The input system is preferably coupled to a text disambiguation system, such as a T9® or SloppyType™ system, to improve the accuracy and usability of the input system.

BRIEF DESCRIPTION OF THE DRAWINGS

FIG. 12 is a schematic view of an alternate selective input system based on the tracking of motion and/or position of a pointing device, wherein the input area is changeable for function and/or appearance; and FIG. 13 is a perspective view of an alternate selective input system based on the tracking of motion of an input device through a region or volume.

DETAILED DESCRIPTION OF PREFERRED EMBODIMENTS

Figure 1:
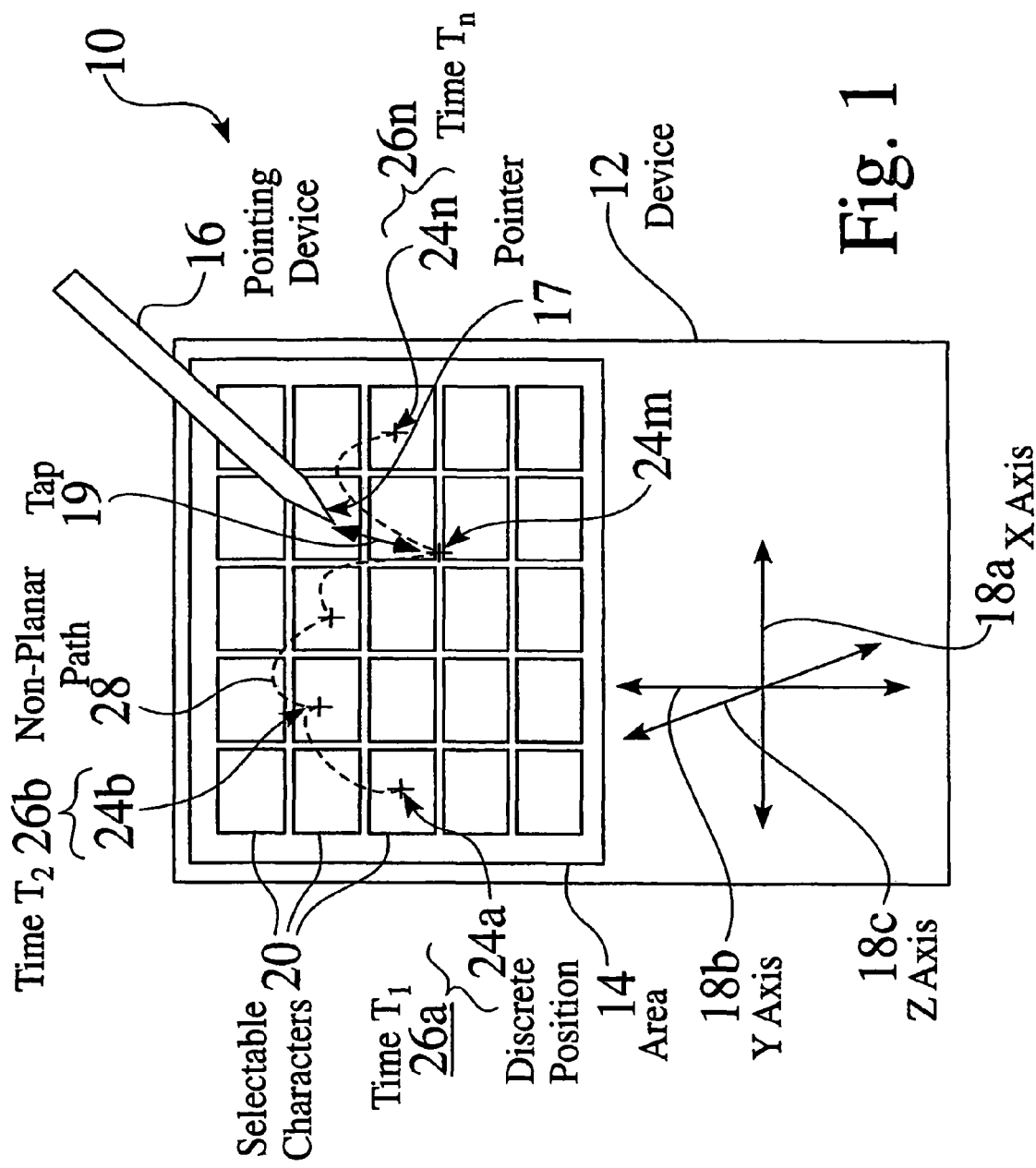
FIG. 1 is a schematic view of a character input system, in which discrete positions of an input device within an input area are determined.

FIG. 1 is a schematic view of a user input system 10, in which discrete positions of a pointing device, i.e. instrument 16 within an input area 14 are determined. Devices 12 often comprise means 16 for pointing or selecting, such as by a stylus, finger, or mouse, whereby a user may interact with a device 12. The user is often required to interact with a user interface area 14, such as a keypad, touchpad, or touch screen, such as to input a desired character 20.

In the user input system 10 shown in FIG. 1, a user typically maneuvers the pointing or selection device 16 over a desired position 24, e.g. 24a, over the interface area 14, and then taps or sets 19 the pointing device 16, such as by contacting a pointing tip or pointer 17 to a desired location 24 within an interface area 14, to activate a chosen region or element, e.g. such as an actual or mapped keypad element or character 20.

As described above, a user is often required to perform a large number of selective pointing actions 19, which can be difficult to perform, and are prone to error. Furthermore, the user interfaces 14 for many devices 12 are often small, such as for small electronic devices, e.g. portable cell phones, personal digital assistants (PDAs), or other devices often used for business, personal, educational, or recreational purposes. The selective pointing functions 19 required to operate such small devices have become increasingly difficult and prone to error, as a user must accurately tap 19 on very small regions within a user interface.

Figure 2:
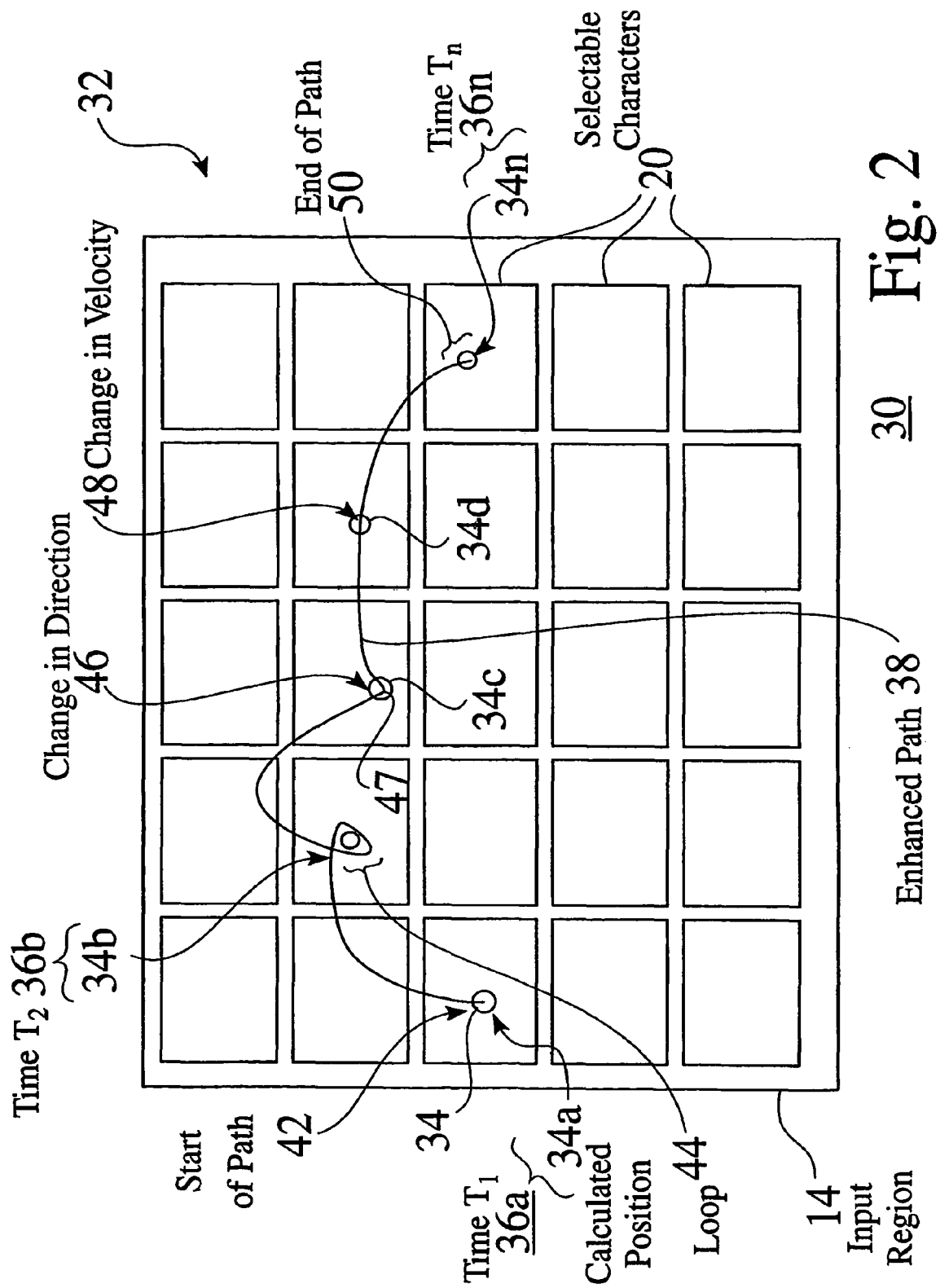
FIG. 2 is a detailed schematic view of a character input system based on exemplary movement and time-based tracking of an input device.

FIG. 2 is a detailed schematic view 32 of a selective input system 30 based on exemplary movement paths 38 and time-based tracking 34, e.g. 34a-34n, of a pointing device 16, such as within an input region 14, such as an area or volume 14. The system 30 and associated process 98 (FIG. 8) identifies character selections, by detecting path starts 42, directional changes 46, velocity changes, e.g. motion pauses 48, and/or path ends 50, at or determined to be near to locations that correspond to features within the input region 14.

As seen in FIG. 2, a path 38 of a device 16 may indicate selected positions 34 by one or more techniques, such as by the start 42 of a path 38, a determined loop 44 in the path 38, a direction change 46, a velocity change, e.g. slowing down or pausing in a location 34, an acceleration away from a location 34, or the end 50 of a path 38. One or more of selected position techniques may be implemented within a selective input system 30, and may also be integrated with the use of pointing or tapping 19 (FIG. 1), such that a device 12 may be easily and intuitively operated by a user.

For example, causing the pointing device 16 to hover over a character 20 for a certain amount of time 36 can be interpreted as a selection of the character 20. Moving the pointing device 16 towards and away from a character 20, such as to and from a character 20, i.e. changing direction 46, can be interpreted as a selection 20. Circling 44 a character can be interpreted as a selection. A slowing down or pausing 48 motion over a character 20 can also be interpreted as selection of a character 20.

Figure 6:
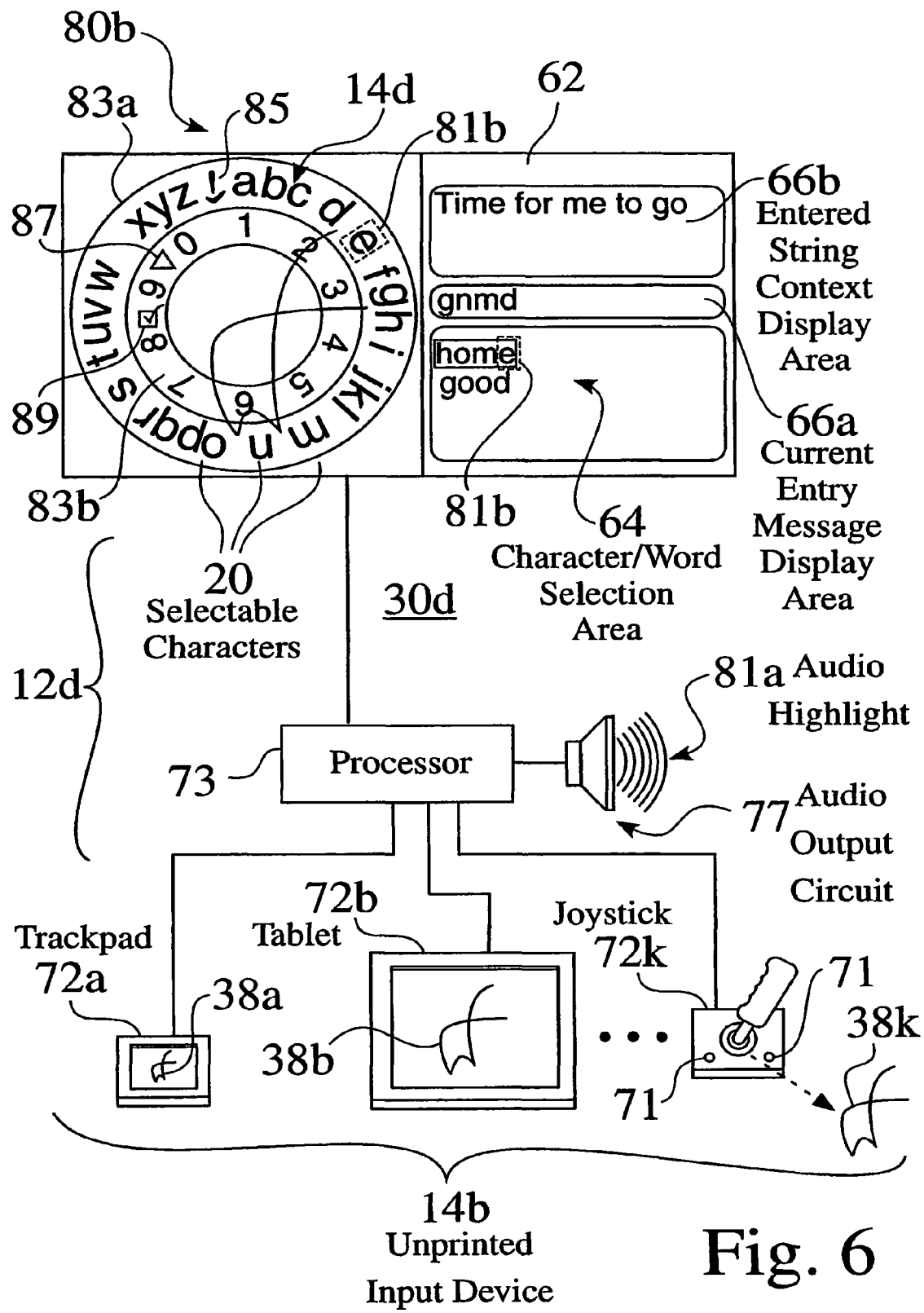
FIG. 6 is a schematic view of a selective input system comprising a circular onscreen input area.

While the exemplary selective input system 30 shown in FIG. 2 is based on two-dimensional movement 38 and time-based tracking 34, e.g. 34a-34n, of a pointing device 16, within an area 14, alternate system embodiments of the selective input system 30 provide three-dimensional tracking, such as in relation to an X-axis 18a, a Y-axis 18b, and a Z-axis 18c, or in relation to other coordinate systems 92, e.g. 92a-92c (FIG. 6).

While the change in direction 46 in FIG. 2 is shown to occur within a small area, comprising a small radius of curvature 47, a change of direction may alternately be determined by other path geometries or characteristics, e.g. such as but not limited to a change in direction over a curve having an estimated radius that is less than a threshold geometry, a sharp cusp edge in a path, or a comparison of path direction before and after a curve or cusp, e.g. such as a change in direction greater than a threshold angle may be used to signify a selection location 34.

In some system embodiments, circling the same selectable region or character 20 multiple times can be interpreted as selecting the character multiple times. Similarly, movement back and forth over a selectable region or character 20 can be interpreted as selecting the same character 20 multiple times.

The selective input system 30 may be implemented on a wide variety of devices 12, such as but not limited to personal computers, mobile devices, appliances, controls, and other microprocessor-based devices, such as portable digital assistants, network enabled cell phones, or other devices often used for business, industrial, personal, educational, or recreational purposes.

Figure 3:
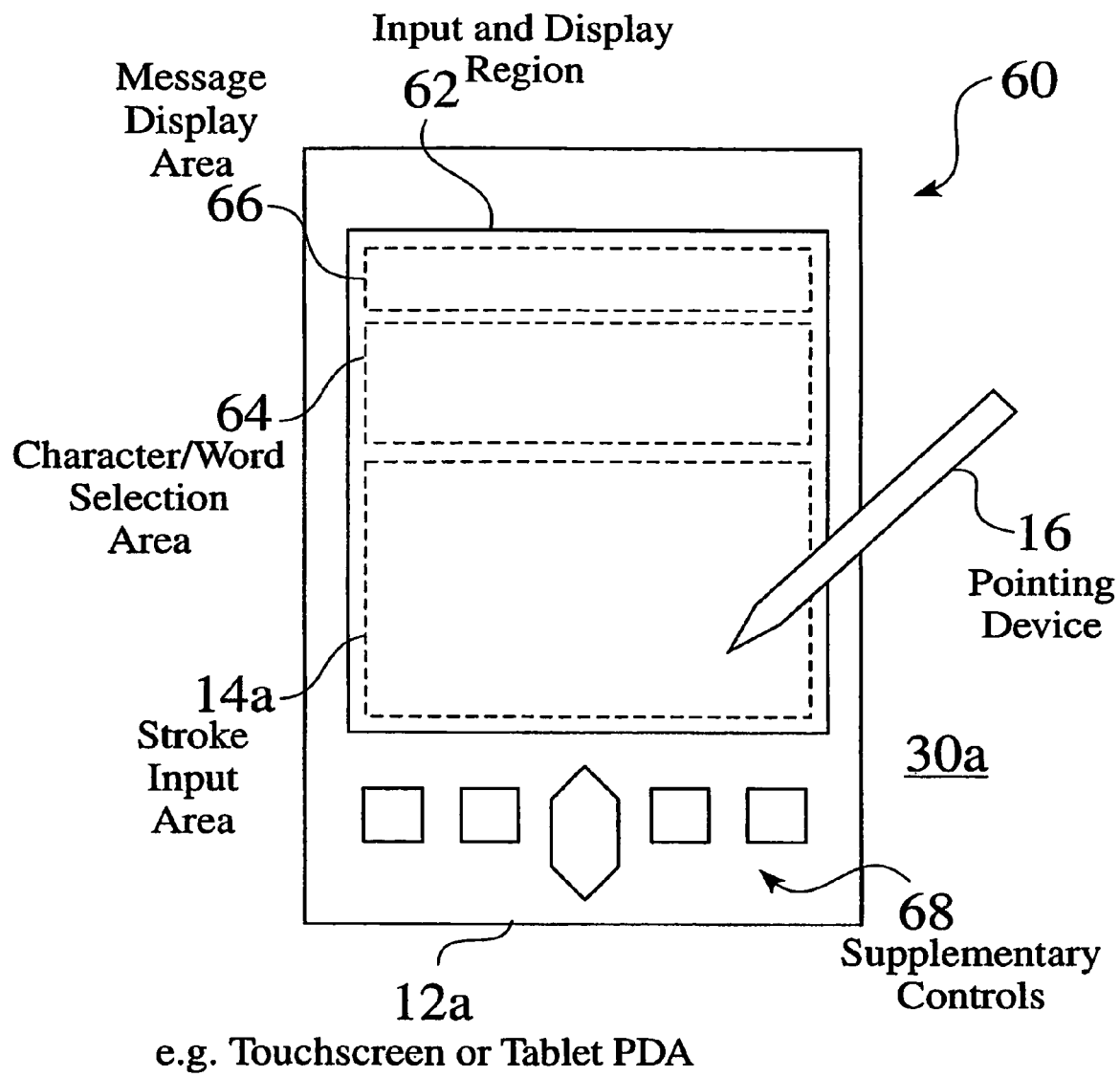
FIG. 3 is a schematic view of a touch screen, wherein stylus input and char/key display preferably share a common interface.

FIG. 3 is a schematic view 60 of a touchscreen device 12a, such as a personal digital assistant (PDA) or a tablet personal computer (PC), where the stylus input and char/key display are effectively the same. A combined region 62 typically comprises a stroke input region 14a, as well as a display region 64, such as to display characters, words, or keys. The combined region 62 may also preferably provide a message display region 66. The device may also comprise supplementary controls 68, such as for navigation within or between device functions.

Figure 4:
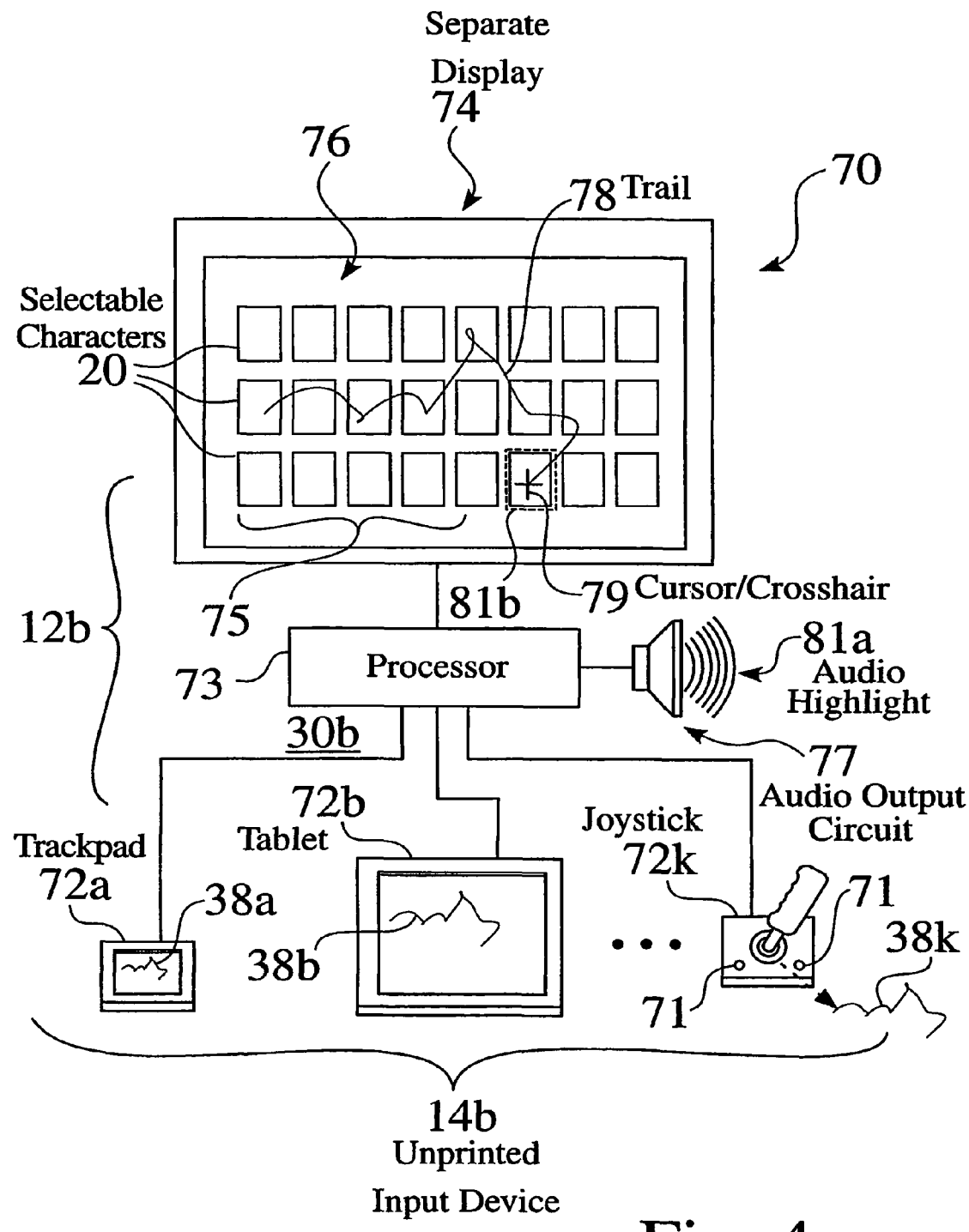
FIG. 4 is a schematic view of an alternate device structure, comprising one or more unprinted inputs linked to a separate display.

FIG. 4 is a schematic view 70 of an alternate device structure 12b, comprising an unprinted input 14b, e.g. such as a trackpad 72a, a tablet 72b, and/or a joystick 72k, linked, such as through a processor 73, to a separate display 76. Selectable movement 38, e.g. 38a-38k, through the input device 14b, e.g. 72a-72c, is tracked, and the path 38 in the input device 14b is indicated in a corresponding displayed path 78, e.g. such as through one or more determined paths 78, i.e. ink trails 78, and/or mouse/crosshair cursors 79. Detected movement paths 38, in relation to the input device 14b, are typically indicated within a char/key area 75, such as in relation to selectable characters, words, items, or keys 20a-20n.

As seen in FIG. 4, an optional ink trail 78 provides a means for visual feedback for hardware configurations 12 in which a char/key area 75 (FIG. 4) is displayed on a screen. In some preferred embodiments, the appearance of the displayed ink trail 78 can change, e.g. color or thickness, to indicate that a selection region has been registered, and/or to indicate a level of system confidence that motion in a region was properly interpreted as a selection.

The ink trail 78 can additionally be enhanced, such as by a highlight, an illumination, a sparkle, or a blinking selection 20, to indicate one or more interpreted selections. In some preferred systems 30b, an ink trail 78 comprises an alternate or complementary audio highlight 81a through an audio output circuit 77. For example, the audio highlight 81a can provide audio feedback to a user USR, such as a tone that rises and falls or fades, wherein the pitch or timbre may preferably indicate system confidence in tracking 34 or a selection 20. Audio highlighting 81a is often preferable for spatial, i.e. 3-dimensional, system embodiments 30g (FIG. 13).

In some system embodiments of the selective input system 30, such as in the selective input system 30b shown in FIG. 4, an auxiliary visual feedback 81b may preferably be provided, such as to display and/or magnify a selectable position 20, such as a selectable area or letter 20, which is determined to be closest to the current tracked location 34. For example, in systems 30 which comprise a printed trackpad 72a or touch screen 72b, where a finger is the primary pointing device 16, and/or in low-light situations, the nearest letter 20 or the immediate selectable area surrounding the current location 34 being tracked may be displayed or magnified 81b, such as in or over the display 74. The visual highlight 81b provides a user USR a visual indication 73 of where the pointing device 16 is currently located 34, i.e. making contact, such as to increase selection accuracy for a pointing device 16, for example when a finger of a user USR blocks a portion of the keyboard area from view, or for lighting conditions which disable viewing.

Figure 5:
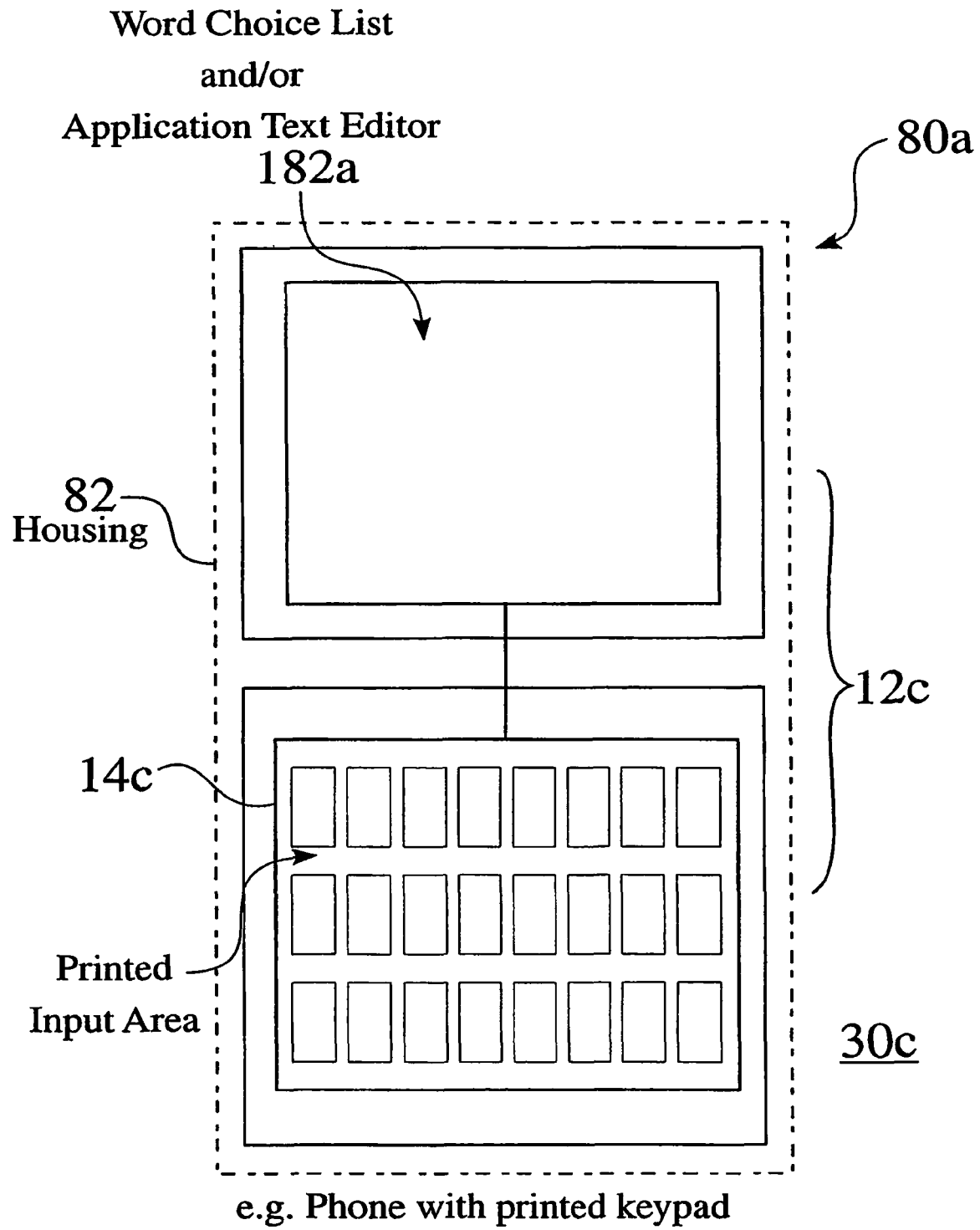
FIG. 5 is a schematic view of a printed entry pad and an output and/or editor display.

FIG. 5 is a schematic view 80a of a device 12c comprising a printed input area 14c, such as a trackpad and/or labeled phone keypad, which provides a permanent character/key area. The input area 14c is linked to a text output display window 182a, for the display of word choice lists, and/or for a text editing display.

FIG. 6 is a schematic view 80b of a device 12d comprising an exemplary non-rectangular, e.g. circular, onscreen input area 14d, corresponding to a selective input system 30. The screen includes an on-screen keyboard 14d and a text display area 62. In alternate system embodiments, the selectable characters 20 may be printed around the joystick device 72k.

The on-screen keyboard area 14d can take a variety of shapes, including but not limited to circle, square, oval and polygon with any number of sides. The visual representation is typically, but not limited to, a two-dimensional plane figure.

The on-screen keyboard 14d may be enhanced by, or even replaced with, a set of compass point letters, such as 'A', 'H', 'N' and 'U'. These compass pointer letters can also be placed in an interactive pointer/cursor on screen or even around the input device 14b, such as around a joystick device 72k.

The letters in the on-screen keyboard 14d can be arranged in any order or orientation. In the preferred layout as shown in FIG. 6, all letters 20 have their bottoms towards the center of the first ring 83a. In an alternative layout, all letters 20 may be upright. In the preferred layout as shown in FIG. 6, the letters are ordered alphabetically. In an alternative layout, the letters may follow the Dvorak order. In the preferred layout as shown in FIG. 6, the letters start at the 12 o'clock position. In an alternative layout, the letters may start at the 9 o'clock location. Alternatively, the letters may have a moving starting position in a rotating keyboard in an embodiment, for example, where the input device is a type of wheel. In the preferred layout as shown in FIG. 6, the letters are placed clockwise in a first character ring 83a. In an alternate layout, the letters may be placed counterclockwise. In the preferred embodiment as shown in FIG. 6, letters 20 occupy different amount of radians depending upon their frequency of use in the language, giving more frequent letters a larger target area. In some system embodiments the sizing of letters 20 can also be dynamic, with letters 20 more likely to follow the just registered letter given more area.

Similarly, selectable digits 20, i.e. "0" through "9", can be arranged in any order or orientation. For example, selectable digits 20 can be located adjacent to the series of letters 20 assigned to the corresponding digit keys on a telephone keypad.

The on-screen keyboard 14d may include letters of a primary input language, letters of alternate input languages (and/or accented letters), digits, and punctuation symbols. The keyboard may also include character components for pictographic languages, diacritics and other "zero-width" characters that attach to preceding characters. The keyboard may further include tone marks, bi-directional characters, functions indicated by a word or symbol, and symbolic representation of a set of characters such as "Smart Punctuation".

The preferred primary text input keyboard as shown in FIG. 6 includes unaccented letters which form an outer ring 83a, digits which form an inner ring 83b, and a symbol or an indicator 85 between the letters "z" and "a", called "Smart Punctuation", which intuitively determines which punctuation is most appropriate based on the word context.

There may be auditory feedback 81a and/or visual feedback 81b on each joystick movement or button press. For example, as soon as the joystick direction is registered, a solid or gradient-fill pie wedge shape could appear on the keyboard, centered on the current direction of tilt. Further, the width of that pie wedge could narrow in proportion to the tilt of the joystick towards the perimeter. The pie wedge can remain momentarily after the joystick is returned to its center/resting position. The pie wedge provides a visual cue that the tilt of the joystick was registered and reinforces the notion that each action represents a range of possible letters.

Figure 7:
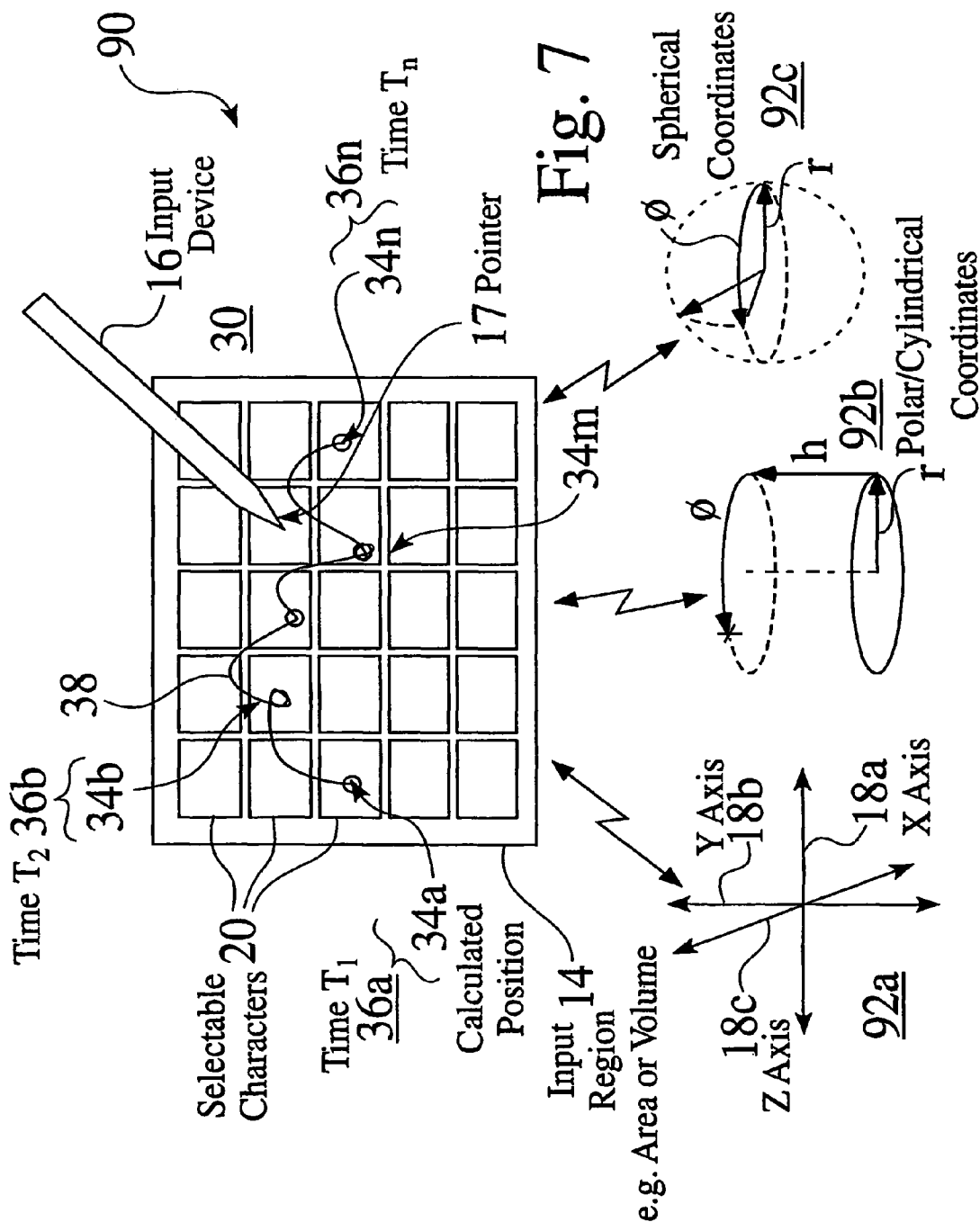
FIG. 7 is a schematic view of a character input system based on the tracking of absolute positions of an input device.

FIG. 7 is a schematic view 90 of a selective input system 30 based on exemplary movement 38 and time-based tracking 48, e.g. relative or absolute, of a pointing device 16. As seen in FIG. 7, movement parameters and/or position parameters are readily made in two or three dimensional systems 92, such as in an orthogonal-axis coordinate system 92a, a cylindrical coordinate system 92b, or a spherical coordinate system 92c. SloppyType™ in Selective Input Systems.

Several embodiments of the selective input system 30, such as systems 30a-30d as seen in FIG. 3 through FIG. 7, preferably comprise enhanced disambiguation, such as but not limited to SloppyType™ disambiguation.

For example, as shown in FIG. 3 and FIG. 6, the selective input system 30 may include a text display area 62, as well as a word choice list region 64 and/or a message area 66. The exemplary word choice list 64 typically comprises a list of words that the system 30 predicts as likely candidates based on the characters entered by ambiguous directional input. For example, the most likely word is a default word. The user can either accept the default word with one action, or select an alternate word with a combination of actions.

The exact spelling sequence of exact characters coincidentally selected by the user is also displayed 66, e.g. 66a (FIG. 6). Preferably, the spelling sequence is displayed in a separate area 66*a*, such as above or below the word choice list 64. Alternatively, the spelling sequence may be displayed as an entry in the word choice list 64, typically the first line or the last line. In FIG. 6, the exact spelling sequence 66*a* is displayed above the word choice list 64.

The last letter 20 entered may also be indicated or highlighted 81, such as on the on-screen keyboard and/or in the exact spell sequence, such as but not limited to font change, color change, reverse video or alternate background color, underline, bold face or italics, and outline. An example of a visual outline or highlight 81*b* can be a box or a circle.

All the words on a word choice list 64, other than the exact spelling sequence at the time when the exact spelling sequence is displayed as the first or last entry, are ordered by a combination of the shortest calculated distances between the input entry sequence and each letter 20 in each word and the recency of use and/or the frequency of use within the given language.

Figure 11:
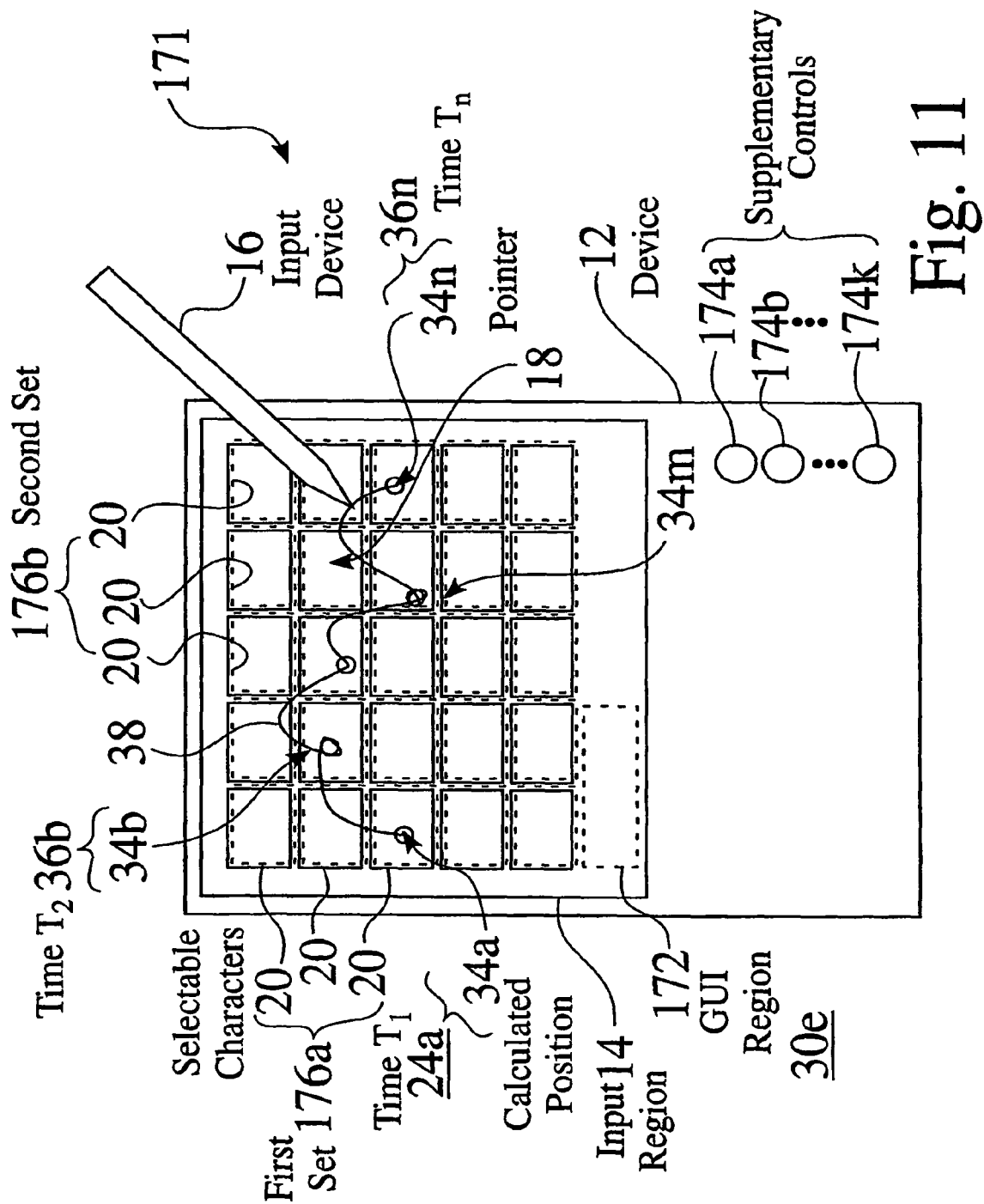
FIG. 11 is a schematic view of an alternate selective input system based on the tracking of motion and/or position of a pointing device, wherein functions of an input region are changeable based on stylus input and/or device controls.

In various embodiments of the selective input system 30, a user can select a specific word from the word choice list, such as through a character/word selection area 64 (FIG. 3), a word choice list or application text editor 182*a* (FIG. 5), and/or through one or more supplementary controls 174*a*-174*k* (FIG. 11). Preferably, the method is consistent with other applications use of scrolling methods and selection button. The system typically comprises a means of selecting the exact spelling sequence as well as any predicted words. In one preferred embodiment, the system comprises a next button and a previous button, with which the user can navigate forward and backward through the word choice list.

In some system embodiments, an "escape hole" 87 is provided, such as located on one or more input rings 83, e.g. 83*a*,83*b* (FIG. 6), that allows movement into the word list 64 or to system menus. As well, in some system embodiments, a default/accept character 89 is provided, such as located on one or more input rings 83, e.g. 83*a*,83*b*, or elsewhere on the onscreen keyboard 14*c*, for accepting a current default word and moving on, such as to the entry of another word.

Alternatively, the selective input system 30 may include a selection mode switch button, such as through one or more buttons 71 (FIG. 4) or supplementary controls 174, e.g. 174*a*-174*k* (FIG. 11). When a selection mode switch button 71, 174 is pressed, the system enters a selection mode and the directional input means can be used to scroll forward and backward through the word choice list.

In addition, selecting a predicted word using a particular means may replace the exact spelling sequence as if the letters of the selected word had been entered directly by the user, and a new list of predicted words is generated.

The most likely word is the word added if the user does not try to select a different word. The default word may be a copy of the exact spelling sequence if the user was accurate. Alternatively, it may be the selected word as described above. In addition, the exact spelling sequence may become the default word if a precision method or mode (described below) is used to explicitly choose at least one letter in the sequence.

Words that are longer than the number of input device actions registered in the current entry sequence may be included in the prediction list. Alternately, a further means can be provided to extend a selected word with completions. For example, longer words that begin with a selected word may appear on a pop-up list after a button press or directional input, similar to the cascading menus on PC windowing systems.

Once a word is entered, the word is typically displayed in the message area 66*a*.

Alternatively, the selective input system 30 can be implemented as an input method editor (IME). In this case, the text entered by the system goes into whatever program is actively accepting input from the system. Other applications may be linked to the system, or the system may be incorporated as part of another application. These applications include but are not limited to: instant messaging, electronic mail, chat programs, web browsing, communication within a video game, supplying text to a video game, as well as word processing.

To enter a text message using some embodiments of the selective input system 30, such as but not limited to system 30 shown in FIG. 7, the user points the input device 14 in the general direction of the desired letter, and then continues pointing roughly to each letter in the desired word. Once all letters have been roughly selected, buttons may preferably be used to select a specific word from the list of potential matches. The selected word goes into the message area 66*a*, which may be an appropriate text application such as email or instant message.

In some three dimensional systems 30, true motion 38 in respect to a z-axis 18*c* is tracked. In alternate embodiments, such as seen in FIG. 4, through pressure sensitive input from a trackpad 72*a*, a tablet 72*b*, or a joystick 72*k*, pressure-sensitive input information can preferably be used to determine motion and position in respect to three dimensions 92 (FIG. 7), such as in respect to a Z-axis 18*c*.

The selective input system 30 and associated method 98 are not limited to require unistroke entry, i.e. one single continuous gesture, for a word. The system can piece together any single to multi-region sequences, and wait for the user to choose the best word choice. For example, within an alphanumeric entry area 75, for the entry of the word "hello", the user can drag the stylus 16 from "h" to "e", then tap twice on "l", and stroke up to "o".

Figure 10:
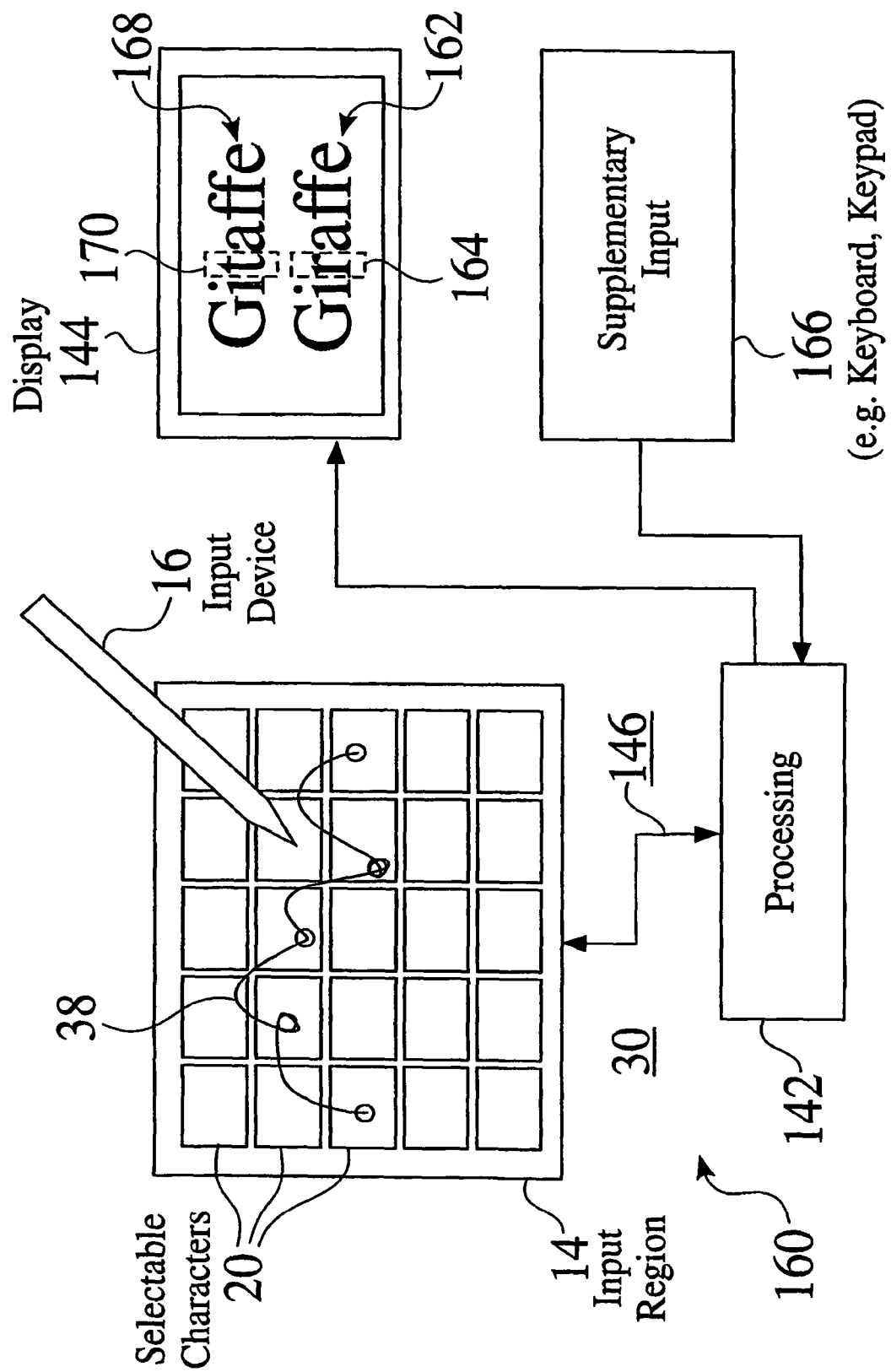
FIG. 10 is a schematic view of preferred processing, input, and display systems associated with an input system based on the tracking of absolute positions of an input device.

Some preferred embodiments of the selective input system 30 further comprise supplementary input 166 (FIG. 10), such as a printed or actual keyboard or keypad 166. Alternatively, a representation of the location 34 of the pointing device 16 over a virtual keyboard or keypad 166 can be dynamically shown on an associated display 144 (FIG. 10).

Figure 8:
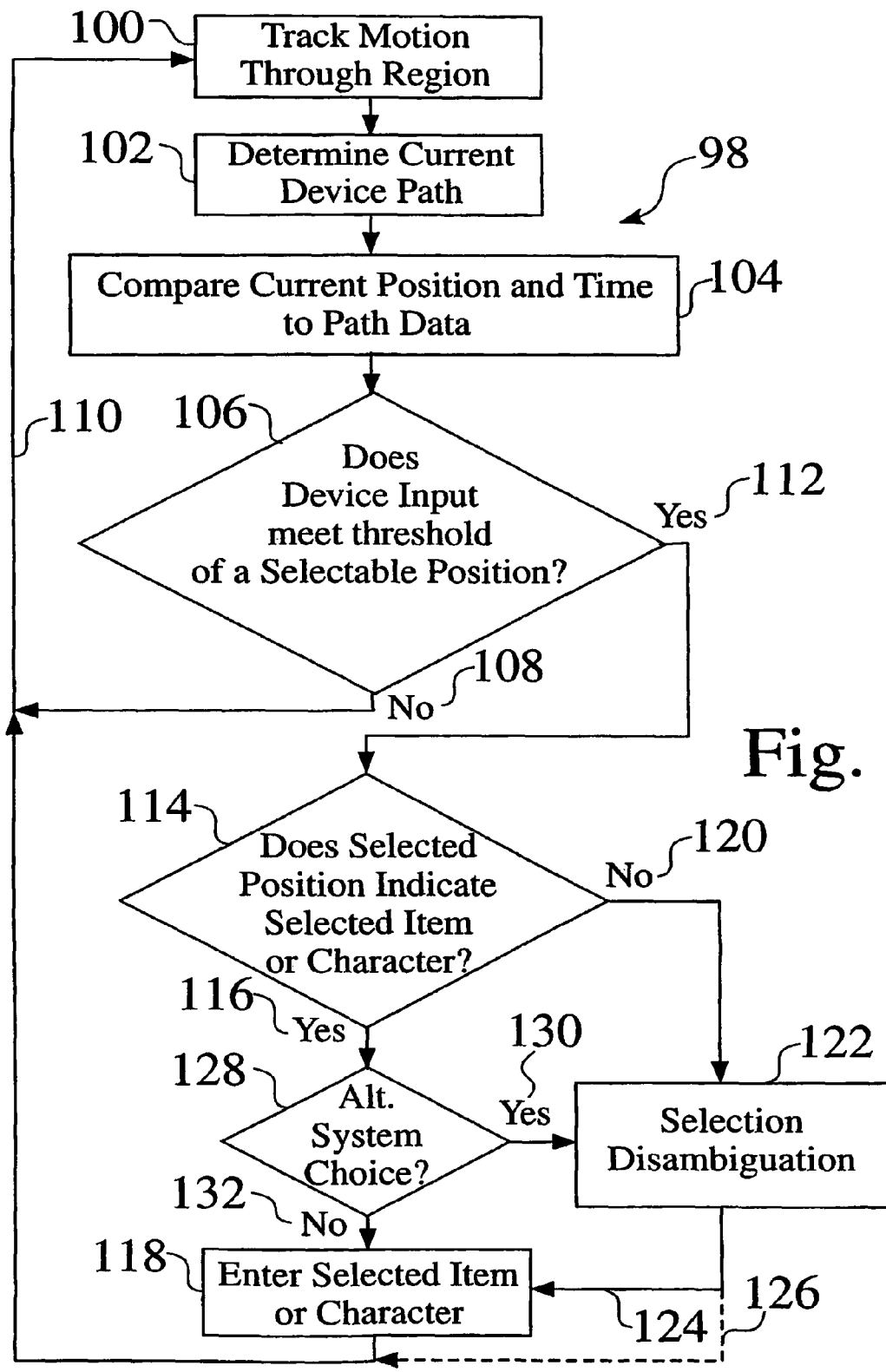
FIG. 8 is a flowchart of an exemplary process for device tracking and character input based on the tracking.

FIG. 8 is a flowchart of an exemplary process 98, implemented on a computer, such as the device 12 or processor 73 (FIG. 4), 142 (FIG. 9, FIG. 10), for device tracking and character input 118 based on the tracking. The system 30 and associated process 98 identify character selections, by detecting changes in direction, changes in velocity, and/or pauses, at locations that correspond to features on the keyboard or keypad.

The motion of a pointing device 16 is tracked 100 over an input region 14, such that the current position 34 of the device 16 is determined 102 at subsequent times 36, thereby defining a device path 38. Once the location 34 and associated time 36 is determined, the location 34 and associated time 36 are compared 104 to path data 38. At decision step 106, the process determines if the current location 34 and associated time 36 meet a threshold of a selectable position or character 20, e.g. such as if the pointing device 16 has changed in direction, changed in velocity, or stopped at a location that corresponds to a feature 20 within the area 14, such as corresponding to a the keyboard or keypad element 20. If the threshold decision is negative 108, the process returns 60 and continues to track 100 the motion.

While the exemplary process 98 describes a comparison between a single location 34 and associated time 36 for the path, one or more points can be analyzed, e.g. such as the current location 34 and the last three to five locations 34, to determine if a discernable selective motion has been made by the user.

If the threshold decision is positive 112, the process decides 114 if the selected position 34 adequately indicates a selected item or character 20, e.g. such as if the identified position 34 is located within or sufficiently near the bounds of a selectable item or character 20. If a selectable item or character 20 is indicated 116, the selected item 20 is entered 118, and the process returns 110 and continues to track 100 the motion. If a selectable item or character 20 is not 120 sufficiently indicated, or if the system 30 determines 130 that an alternate selection 130 may be a valid or more valid choice, some embodiments of the process 98 disambiguate 122 the selection 34,36 if possible 124, and return to track 100 the motion. If an attempt to disambiguate 122 is not successful 126, the system 30, 98 may return to track 100 the motion, such as by passing over the position, entering a blank character, or prompting the user to correct or reenter the intended selection 20, either by the pointing device 16, or through supplementary input 166 (FIG. 10).

The disambiguation process 122 may comprise a determination of the closest selectable character or item 20, a determination of a group of selections 20, e.g. a word, or a determination one or more likely selections 20, by which a user can either choose from the determined likely selections 20, or may otherwise enter a corrected selection 20. The disambiguation process 122 may alternately comprise a selection of a position or vicinity in the region of multiple characters 20, as opposed to focusing on the selection of a single character 20.

In some embodiments of the input system 30 and associated process 98, the disambiguation function 122 comprises a text disambiguation system 122, such as a T9® or Sloppy-type™ disambiguation system 122, to improve the accuracy and usability of the input system 30.

Details regarding disambiguation systems and processes 122 are seen in U.S. Pat. No. 5,818,437, entitled REDUCED KEYBOARD DISAMBIGUATING COMPUTER; U.S. application Ser. No. 10/677,890, filed 1 Oct. 2003, entitled DIRECTIONAL INPUT SYSTEM WITH AUTOMATIC CORRECTION; U.S. application Ser. No. 09/580,319, filed 26 May 2000, entitled "KEYBOARD SYSTEM WITH AUTOMATIC CORRECTION"; and U.S. Provisional Application 60/461,735, filed 9 Apr. 2003, entitled "DIRECTIONAL SLOPPY TYPE", which are incorporated herein by reference.

Figure 9:
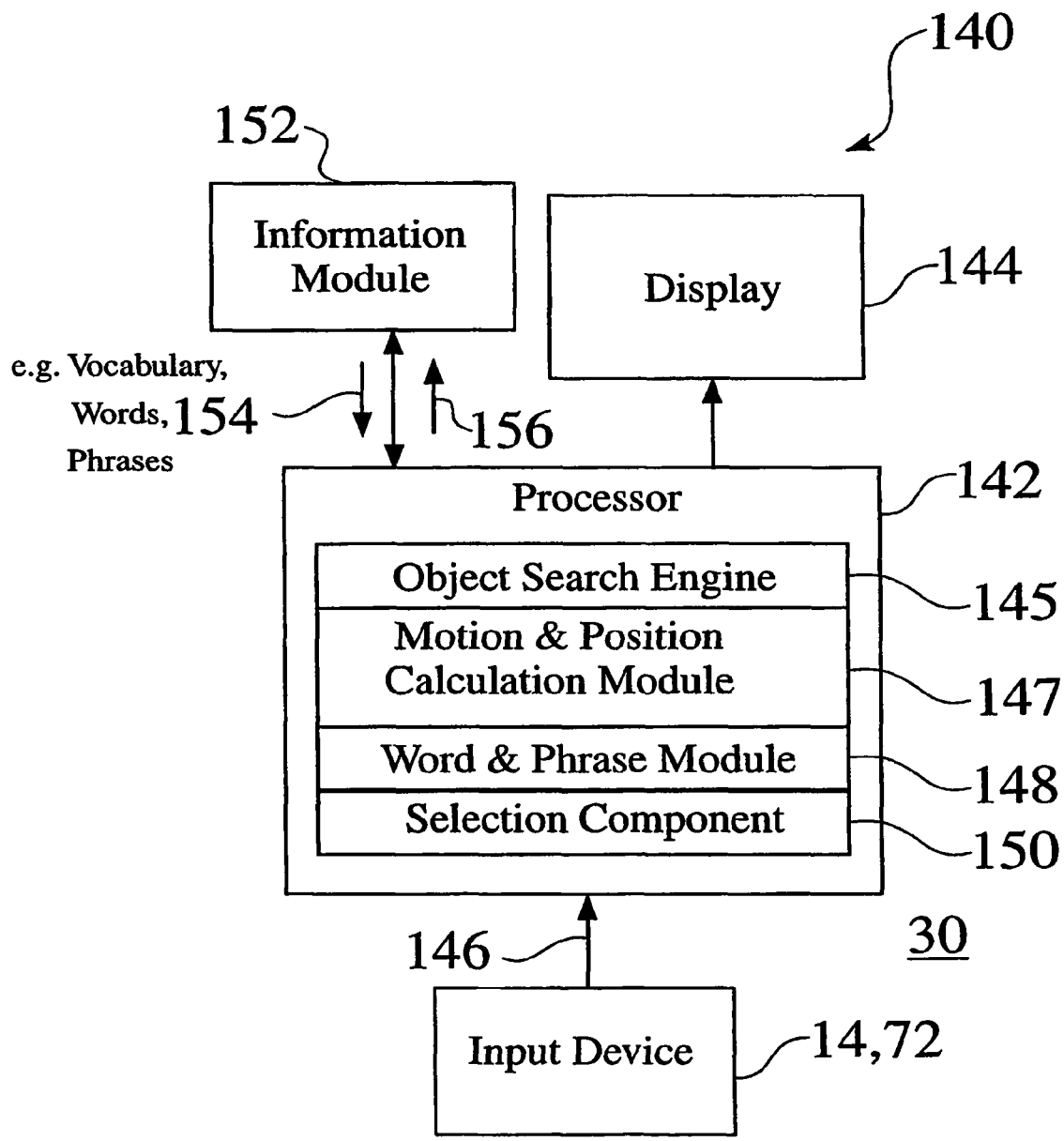
FIG. 9 is a schematic block diagram of a directional input system incorporating disambiguation and associated external information.

FIG. 9 is a block schematic diagram 140 illustrating an exemplary selective input system 30 which comprises disambiguation functionality, according to a preferred embodiment of this invention. The selective input system 30 shown in FIG. 9 includes an analog input device 14, e.g. such as a joystick 72k (FIG. 4), preferably also comprising one or more buttons 71 (FIG. 4), an external information module 152 which typically stores a collection of linguistic objects, e.g. words and/or phrases, a display device 144 having a text display area, and a processor 142. The processor 142, which connects the other components together, further includes an object search engine 145, a motion and position calculation module 147 for calculating distance values, a word and phrase (linguistic object) module 148 for evaluating and ordering words, and a selection component 150. The system 30 may further comprise an optional on-screen representation of a keyboard 75 (FIG. 4) viewable through the display device 144.

As described above, some preferred system embodiments 30 comprise text disambiguation functionality, such as to disambiguate the intended selection 20 of a device, or to provide a user with possible selection choices 20 for one or more selectable characters 20 that are determined to be possible selections, or with word or phrase choices 148 that may potentially be represented by the selection sequence.

For example, on a standard QWERTY keyboard 166 (FIG. 10), selectable buttons 20 for the letters "R", "T", "F", and "G" are located relatively close. For a determined position 24,34 of a pointing device 16 that lies close to the adjoining region of the letters "R", "T", "F", and "G", e.g. location 24m (FIG. 1), a text disambiguation module 72 may determine the likely choices "R", "T", "F", and "G", such as within the display 144, whereby a user may readily choose the listed word that includes the intended selection 20 in the proper position in the character sequence.

FIG. 10 is a schematic view 160 of preferred processing 142, input 146, and display 162 systems associated with an input system 30d based on the tracking of absolute positions of a pointing device 16.

The supplementary input 166 typically comprises a printed or actual keyboard or keypad 166. Alternatively, a representation of the location 24,34 of the pointing device 16 over a virtual keyboard or keypad 166 can be dynamically shown on an associated display 144.

As seen in FIG. 10, a display 144 may be used to display 168 one or more determined selected characters 20, e.g. the misspelled word "Gitaffe", wherein the exemplary determined position 34 of a pointing device 16 for the third letter 170 is T. In some system embodiments 30, the determined characters 20 are displayed for a user, such that a user may edit one or more selections 20. For example, as seen in FIG. 10, a user may change the third letter "t" to an "r", to produce a corrected word group "giraffe" 164, such as through selection of alternate words from a word list, or through cursor selection 170 of one or more letters or characters, and entry of a desired letter or character 164, typically through reentry of the pointing device 16, or through the secondary input 166.

The input device 14,72 serves as a selection input device, which provides a possibility of directional input with a sufficient precision, preferably 10 degrees or more precise. It may preferable that the default position of the cursor 79 (FIG. 4), if it is shown, is within an active region within a viewable display 144, such as at the center of an onscreen region 75. It is possible to use a joystick device to navigate in two dimensions an on-screen "QWERTY" or "ABC" keyboard, either in the standard rectangular form or in a circular layout. It is also possible to navigate through multiple concentric rings of characters.

Although an analog joystick 72k is described as the selection device 14 in the selection system 160 shown in FIG. 10, any input device 14 that provides the is possibility of directional input with a sufficient precision can be used. For examples: omni-directional rocker switch, thumbstick, e.g. IBM TrackPoint™, touchpad, touchscreen, touchscreen and stylus combination, trackball, eye tracking device, trapped-disk sliding switch, steering wheel, Apple iPod™ Navigation Wheel, or Sony's Jog-dial and data glove, e.g. old Nintendo Game Glove, can be used as alternatives.

The input system 30 shown in FIG. 10 provides a method for precisely choosing the letters of a word. The method is useful for entering uncommon names and any word that is not part of the standard language currently active. The method can also be used to change the last character entered by stepping between characters adjacent to the last character entered. To step between characters adjacent to the last character entered, supplementary input 166, such as a forward button and/or a backward button may be used. Once the character 170 entered has been changed 164, the word choice list refreshes to reflect the changes in the predicted words.

Alternatively, the system may be switched to a precision mode and the directional input means may be used to cycle through letters. For example, in a joystick configuration 72k (FIG. 6), to switch to the precision mode, the system may choose to use the degree of joystick tilt from the center. Once the tilt exceeds a preconfigured limit, the system 30 switches to the precision mode. Alternatively, the system 30 may use the time interval that the joystick dwells at the perimeter. Once the time interval reaches a preconfigured limit, the system switches to the precision mode and notifies the user through a visual cue or a tone. The system may also include a button for switching to precision mode.

For example, as seen in FIG. 10, a user may change the third letter "t" to an "r", to produce a corrected word group "giraffe" 164, such as through selection of alternate words from a word list, or through cursor selection 170 of one or more letters or characters, and entry of a desired letter or character 164, typically through reentry of the pointing device 16, or through the secondary input 166.

The linguistic objects that are stored in the information module 152 (FIG. 9) typically comprise but are not limited to: words, phrases, abbreviations, chat slang, emoticons, user IDs, URLs, and/or non-English (such as Chinese or Japanese) characters. Although words are used in the preferred embodiments, any other linguistic objects are equally applicable. Similarly, although the term "letter" or "character" is used in the preferred embodiment, other sub-word components from Non-English languages, e.g. strokes, radicals/components, jamos, kana, plus punctuation symbols and digits, are equally applicable.

The list of predicted or alternate words is typically ordered in accordance with a linguistic model, which may include one or more of: frequency of occurrence of a word in formal or conversational written text; frequency of occurrence of a word when following a preceding word or words; proper or common grammar of the surrounding sentence; application context of current word entry; and recency of use or repeated use of the word by the user or within an application program.

One or more techniques can be implemented within a disambiguation process 122 (FIG. 8). In some situations, even if one or more characters are clearly indicated and selected, the disambiguation process 122 may reject the word, e.g. such as characters within a misspelled word, and offer a choice of correctly spelled alternate words, or may automatically replace the word, e.g. such as for commonly mistyped words or transposed letters. For example, in a situation in which a user USR has clearly entered an "S", the disambiguation process may suggest an "A" or a "D", such as for choices of one or more neighboring selectable characters 20 in a QWERTY keyboard, which may be determined to be logical. Therefore, even if a user USR precisely enters or indicates a selectable position 20, the disambiguation process 122 may provide one or more determined optional choices, e.g. by presenting the user with a display note, such as "Is this alternative choice what you meant to enter?".

As well, the disambiguation process 122 may determine a selection motion at a position which does not clearly indicate a selected position 20 within the input region 14.

While the disambiguation process 122 is readily adapted to provide spell checking, the process 122 can also provide other disambiguation. For example, after entering a complete word or phrase, i.e. following a path 38 that returns multiple character candidates 20 at each spot 34 along the path 38, individual "selected positions 20 can be disambiguated with multiple mechanisms, wherein the mechanism typically uses context, such as the current input or display language, adjacent characters or words, previously used words or phrases, and/or known words or phrases.

Alternate System Embodiments.

FIG. 11 is a schematic view 171 of an alternate selective input system 30e based on the tracking of absolute positions of a pointing device 16, wherein functional sets 176, e.g. 176a,176b, of selectable characters 20 of an input region 14 are changeable, such as based on stylus input 172 and/or device controls 174a-174k. For example, the selectable characters 20 may readily be changed in function to alternate characters 20, and may also be associated with different display characters. For example, stylus input 172 and/or device controls 174a-174k may be used as a shift, option, or control keys, whereby selectable characters are replaced with alternate characters.

In alternate system embodiments 30e, a user does not have to explicitly select an input method, i.e. a set 176 of selectable characters. For example, by simply using the provided interface, such as through screen entry or by pressing one or more keys, the system may automatically switch or adjust to an alternate input set 176.

In alternate embodiments of the selective input system 30, wherein characters or locations are selected, the system 30 preferably provides means for successive or repeated entry of one or more selectable items, characters, and/or locations, such as through action of a pointing device 16, e.g. a loop 44 on or near a selectable item 20, followed by a tap 19 in the same region. As well, supplementary input, such as but not limited to stylus input 172 and/or device controls 174a-174k, can be used for successive or repeated entry of one or more selectable items, characters, and/or locations.

In alternate embodiments of the selective input system 30, entire keyboard arrangements are readily changed, such as to be suitable for an intended function, or based upon the preference of a user. For example, the design of a QWERTY keyboard set 176, can be changed to a DVORAK keyboard set 176, or a phone directory interface set 176 can be changed to a telephone keypad interface set 176. Similarly, all or part of the input screen area 14 may be used in combination with shorthand or character recognition type entry, e.g. Graffiti®.

FIG. 12 shows a schematic view 180 of an alternate selective input system 30f, based on the tracking of absolute positions of a pointing device 16, wherein the input region 14 is changeable for function and/or appearance. For example, the device 12 is readily adapted to provide a plurality of different functions 182a-182j, through which the selective input system 30e tracks the motion parameters of a pointing device 16, e.g. such as but not limited to a text entry 182a, spell checking 182b, an alternate keyboard 182c, a schedule interface 182d, a to-do list 182e, or other graphic interfaces 182f,182j.

As seen in to-do list interface 182e, a user may readily input desired priorities 186 on a group of tasks 184, such that the tasks 184 are readily rearranged, based on the tracked path 38. As seen in graphic area interface 182f, a user may readily input a desired travel itinerary 188, based on tracked travel path 186 on a map 190. Similarly, a graphic area interface 112j can display a game interface 192, whereby the tracking of motions and/or positions of a pointing device 16 determines game actions, decisions and/or outcomes 194, such as success 194a and/or accumulated points 194b.

FIG. 13 is a perspective view 200 of an alternate selective input system 30g based on the tracking of motion 38 of an input device through a region or volume 14. The selective input system 30f and associated method 98 are readily adapted to provide an input system based upon motion of an actual device 12, such as to detect two or three-dimensional motion in a variety of coordinate systems 92, e.g. 92a-92c.

In the exemplary system 30f shown in FIG. 13, a user USR controllably moves an input device 12, such as but not limited to a stylus, PDA, cell phone, laser pointer, light pen, bare hand HD, a glove 204, or finger 12. For example, in a gaming system, a glove can be used for motion tracking. As well, while the exemplary system 30f shown in FIG. 13 shows the possible tracking of a bare hand HD or a gloved hand 204, other portions of the body of a person may be tracked, such as but not limited to a foot, a head, or other appendages. Similarly, while the exemplary system 30f shown in FIG. 13 shows the possible tracking of a glove 204, other accessories, tools, or articles of clothing 204 may alternately be used as a pointing device 12 for motion tracking, such as but not limited to a ring, a bracelet, a hat, a toy, or a wand. For example, the motion of a pointing tip of a play sword or wand 12 can be tracked, which can additionally be displayed on a projection screen 202, such as in context with a game scene.

Upon detection of relative motion and path 38 and/or subsequent positions 34, the enhanced device 12 is readily used for a wide variety of applications, such as but not limited to writing, game input, and/or control, either within the device itself 12, or in relation to other devices 202.

In some alternate selective input systems 30g, the enhanced input device comprises accelerometers and/or a detection field for detection of relative motion and path 38 and/or subsequent positions 34. In other alternate selective input systems 30g, emitted light from laser pointer 12 is projected in relation to a projection screen 202, such as to provide a two-dimensional input. In yet another alternate selective input system 30g, emitted light from a light pen is detected on scan lines of a video screen 202, such as to provide an alternate two-dimensional input. In another alternate input system 30g, the motion of a user, e.g. a user's hand or finger, is tracked, such as by but not limited to a camera, radar, or lidar, such that no device needs to be held by the user USR.

In the exemplary system 30g shown in FIG. 13, a user USR can cursively write a note, the motion of which is detected, calculated as an entry, disambiguated as necessary, and stored on the device 12. In a similar embodiment, a user can cursively enter a phone number or quick dial entry on an enhanced phone, receive acoustic feedback, such as a message of the intended number, e.g. "The phone number you entered is 555-555-1234", and have the number dialed automatically. In an alternate embodiment, a user USR can cursively enter a desired cable channel, wherein the motion of which is detected, calculated as an entry, disambiguated as necessary, and sent to an external appliance or controller 202.

In the selective input system 30g, the motion of input device 12 is tracked within the region or volume 14, while the user USR preferably gets visual feedback for the current "location" of the enhanced device 12, relative to the specific region or volume 14, to provide a plurality of different functions 182a-182j (FIG. 12), e.g. such as but not limited to a text entry 182a, spell checking 182b, an alternate keyboard 182c, a schedule interface 182d, a to-do list 182e, or other graphic interfaces 182f,182j.

In some preferred embodiments of the selective input system 30g, the display 202 is separate from the input device 12, such as TV screen 202, e.g. for gaming or channel switching applications, or for a heads-up display 202.

System Advantages.

The selective input system 30 and associated method 98 provide significant advantages over existing character input systems, such that a user may quickly and intuitively enter one or more selections 20, even within a small interface area 14. In contrast to systems in which a user must repeatedly and accurately point or tap selections 20, the selective input system 30 and associated method 98 allow a much broader use of a pointing device 16, wherein the device 16 can be used in a variety of planar or non-planar movements to enter one or more selectable items or characters 20.

While the selective input system 30 and associated method 98 can be used in combination with alternate methods of user input, e.g. stylus-based shorthand or handwriting recognition systems, the selective input system 30 and associated method 98 provide an intuitive entry system that can be used in many input environments. For example, the selective input method 48 can similarly be implemented on a planar keyboard, a keypad, or a telephone interface.

Although the selective input system and methods of use are described herein in connection with personal computers, mobile devices, appliances, controls, and other microprocessor-based devices, such as portable digital assistants or network enabled cell phones, the apparatus and techniques can be implemented for a wide variety of electronic devices and systems, or any combination thereof, as desired.

As well, while the selective input system and methods of use are described herein in connection with interaction between a two-dimensional input devices and systems, the character input system and methods of use can readily be implemented for selection within other dimensional systems, such as for one-dimensional slide controls, three-dimensional location or selection, or any combination thereof, as desired.

Accordingly, although the invention has been described in detail with reference to a particular preferred embodiments, persons possessing ordinary skill in the art to which this invention pertains will appreciate that various modifications and enhancements may be made without departing from the spirit and scope of the invention and the claims that follow.

What is claimed is:
1. An apparatus for selectable input, comprising:
a touch screen having a plurality of selectable regions therein; and
at least one processor programmed for
  tracking motion that corresponds to interaction of a user in relation to the touch screen, wherein the tracked motion defines a path comprising path data, wherein the path data comprises sequential positions and corresponding times;
  for each sequential position, comparing the current position and corresponding time to the path data;
  detecting if the current position meets a threshold of a selectable position along the defined path, wherein the defined path comprises at least two selectable positions,
    wherein the threshold of a selectable position in relation to the touch screen comprises any of starting the defined path, looping the defined path, changing direction of the defined path, changing velocity of the defined path, pausing motion in the defined path, and ending the defined path, and
    wherein the threshold of changing direction comprises any of a curve having an estimated radius that is less than a threshold geometry, a comparison of the defined path direction before and after a curve, a sharp cusp edge in the defined path, or a comparison of path direction before and after a cusp;
  determining which of the detected selectable positions along the defined path correspond to one of the selectable regions; and adding a selection that corresponds to the determined selectable region to a sequence of selections that corresponds to the defined path.

2. The apparatus of claim 1, wherein the motion associated with the user interaction comprises motion of any of a stylus, an input device, or at least a portion of the body of the user.

3. The apparatus of claim 2, wherein the portion of the body of the user comprises one or more fingers.

4. The apparatus of claim 1, wherein the selectable regions are associated with any of characters, numbers, tasks, actions, functions, decisions, priorities, outcomes, or points.

5. The apparatus of claim 1, wherein the at least one processor is further programmed to dynamically show a representation of the location of the path on a display.

6. The apparatus of claim 1, wherein the at least one processor is further programmed to disambiguate at least one subsequent position that does not clearly indicate a selectable region within the touch screen.

7. The apparatus of claim 1, wherein the touch screen is associated with any of a portable digital assistant, a portable telephone, a mobile telephone, a portable computer, or a portable game device.

8. The apparatus of claim 1, wherein the at least one processor is further programmed to disambiguate at least one determined position that corresponds to an alternate selection.

9. The apparatus of claim 8, wherein the at least one processor is further programmed to display the alternate selection, and enter a choice selected by the user between the determined position and the alternate selection.

10. The apparatus of claim 1, wherein the at least one processor is further programmed to disambiguate at least one subsequent position based upon a contextual comparison between the subsequent position and stored information.

11. An apparatus for selectable input, comprising:
a touch screen; and
at least one processor programmed for
tracking motion that corresponds to the interaction of a user in relation to the touch screen, wherein the tracked motion defines a path comprising path data, wherein the path data comprises sequential positions and corresponding times,
comparing the current position and corresponding time for each sequential position to the path data, and
determining if the current position meets a threshold of a selectable position along the defined path;
wherein when the current position meets the threshold of a selectable position along the path, the processor is programmed to determine if the selectable position corresponds to a selection, and wherein the processor is programmed to add the corresponding selection to a sequence of selections that corresponds to the defined path.

12. The apparatus of claim 11, wherein the motion that corresponds to the interaction of the user comprises motion of any of a stylus, an input device, or at least a portion of the body of the user.

13. The apparatus of claim 12, wherein the portion of the body of the user comprises one or more fingers.

14. The apparatus of claim 11, wherein the selectable position is associated with any of a character, a number, a task, an action, a function, a decision, a priority, an outcome, or at least one point.

15. The apparatus of claim 11, wherein the at least one processor is further programmed to dynamically show a representation of the path on a display.

16. The apparatus of claim 11, wherein the at least one processor is further programmed to disambiguate at least one subsequent position that does not clearly indicate a selectable region within the touch screen.

17. The apparatus of claim 11, wherein the selectable position comprises any of starting the path, looping the path, changing direction of the path, changing velocity of the path, pausing motion in the path, or ending the path.

18. The apparatus of claim 17, wherein the selectable position of changing direction comprises any of a curve having an estimated radius that is less than a threshold geometry, a comparison of the path direction before and after a curve, a sharp cusp edge in the path, or a comparison of path direction before and after a cusp.

19. The apparatus of claim 11, wherein the touch screen is associated with any of a portable digital assistant, a portable telephone, a mobile telephone, a portable computer, or a portable game device.

20. The apparatus of claim 11, wherein the at least one processor is further programmed to disambiguate at least one determined position that corresponds to an alternate selection.

21. The apparatus of claim 20, wherein the at least one processor is further programmed to display the alternate selection, and enter a choice selected by the user between the determined position and the alternate selection.

22. The apparatus of claim 11, wherein the at least one processor is further programmed to disambiguate at least one subsequent position based upon a contextual comparison between the subsequent position and stored information.

23. A system for selectable input, comprising:
a touch screen having a plurality of selectable regions therein;
a mechanism for tracking motion associated with the interaction of a user in relation to the touch screen, wherein the tracked motion defines a path comprising path data, wherein the path data comprises sequential positions and corresponding times; and
at least one processor programmed for
comparing the current position and corresponding time for each sequential position to the path data, and
determining if the current position meets a threshold of a selectable position along the defined path;
wherein when the current position meets the threshold of a selectable position along the path, the processor is programmed to determine if the selectable position corresponds to a selection, and wherein the processor is programmed to add the corresponding selection to a sequence of selections that corresponds to the defined path.

24. The system of claim 23, wherein the motion corresponding to user interaction comprises motion of any of a stylus, an input device, or at least a portion of the body of the user.

25. The system of claim 24, wherein the portion of the body of the user comprises one or more fingers.

26. The system of claim 23, wherein the selectable regions are associated with any of characters, numbers, tasks, actions, functions, decisions, priorities, outcomes, or points.

27. The system of claim 23, wherein the at least one processor is further programmed to disambiguate at least one subsequent position that does not clearly indicate a selectable region within the touch screen.

28. The system of claim 23, wherein the at least one processor is further programmed to disambiguate at least one determined position that corresponds to an alternate selectable region.

29. The system of claim 23, wherein the selectable position comprises any of starting the path, looping the path, changing direction of the path, changing velocity of the path, pausing motion in the path, or ending the path.

30. The system of claim 29, wherein the selectable position of changing direction comprises any of a curve having an estimated radius that is less than a threshold geometry, a comparison of the path direction before and after a curve, a sharp cusp edge in the path, or a comparison of path direction before and after a cusp.

* * * * *